US012652348B2

(12) United States Patent
Wang et al.

(10) Patent No.: US 12,652,348 B2
(45) Date of Patent: Jun. 9, 2026

(54) CALLEE AND CALLER COMMUNICATION AND COMMUNICATION SERVICING METHODS

(71) Applicants: Zhenkun Wang, Cambridge, MA (US); Charlotte Xiyou Wang, Cambridge, MA (US)

(72) Inventors: Zhenkun Wang, Cambridge, MA (US); Charlotte Xiyou Wang, Cambridge, MA (US)

( * ) Notice: Subject to any disclaimer, the term of this patent is extended or adjusted under 35 U.S.C. 154(b) by 614 days.

(21) Appl. No.: 18/106,839

(22) Filed: Feb. 7, 2023

(65) Prior Publication Data

US 2024/0267458 A1     Aug. 8, 2024

(51) Int. Cl.
        *H04M 3/42*          (2006.01)
        *G10L 15/26*        (2006.01)
(52) U.S. Cl.
        CPC ......... *H04M 3/42042* (2013.01); *G10L 15/26* (2013.01)
(58) Field of Classification Search
        CPC ......................... H04M 3/42042; G10L 15/26
        See application file for complete search history.

(56) References Cited

U.S. PATENT DOCUMENTS

| | | | |
|---|---|---|---|
| 2003/0119492 A1* | 6/2003 | Timmins ........... | H04M 3/42068 |
| | | | 455/445 |
| 2006/0212561 A1* | 9/2006 | Feng ..................... | G06Q 20/40 |
| | | | 709/223 |
| 2010/0020728 A1* | 1/2010 | Jefferson ................. | H04L 67/54 |
| | | | 709/204 |
| 2020/0092416 A1* | 3/2020 | Wiegand ............. | H04M 1/2757 |
| 2022/0060467 A1* | 2/2022 | Montgomery ........ | H04L 9/3234 |
| 2024/0267458 A1* | 8/2024 | Wang ................ | H04M 3/42042 |

* cited by examiner

*Primary Examiner* — Jeanette J Parker
*Assistant Examiner* — Michele C Douglas
(74) *Attorney, Agent, or Firm* — WPAT, PC

(57)         ABSTRACT

A communication servicing method provided by the present application comprising: receiving a request from a callee account to check whether an inbound communication received by a callee phone via a telecommunication network is acceptable; determining whether a caller id number of the inbound communication is associated with a ticket registered by the callee account; and returning that the inbound communication is acceptable to the callee phone when the caller id number of the inbound communication is associated with the ticket registered by the callee account.

5 Claims, 16 Drawing Sheets

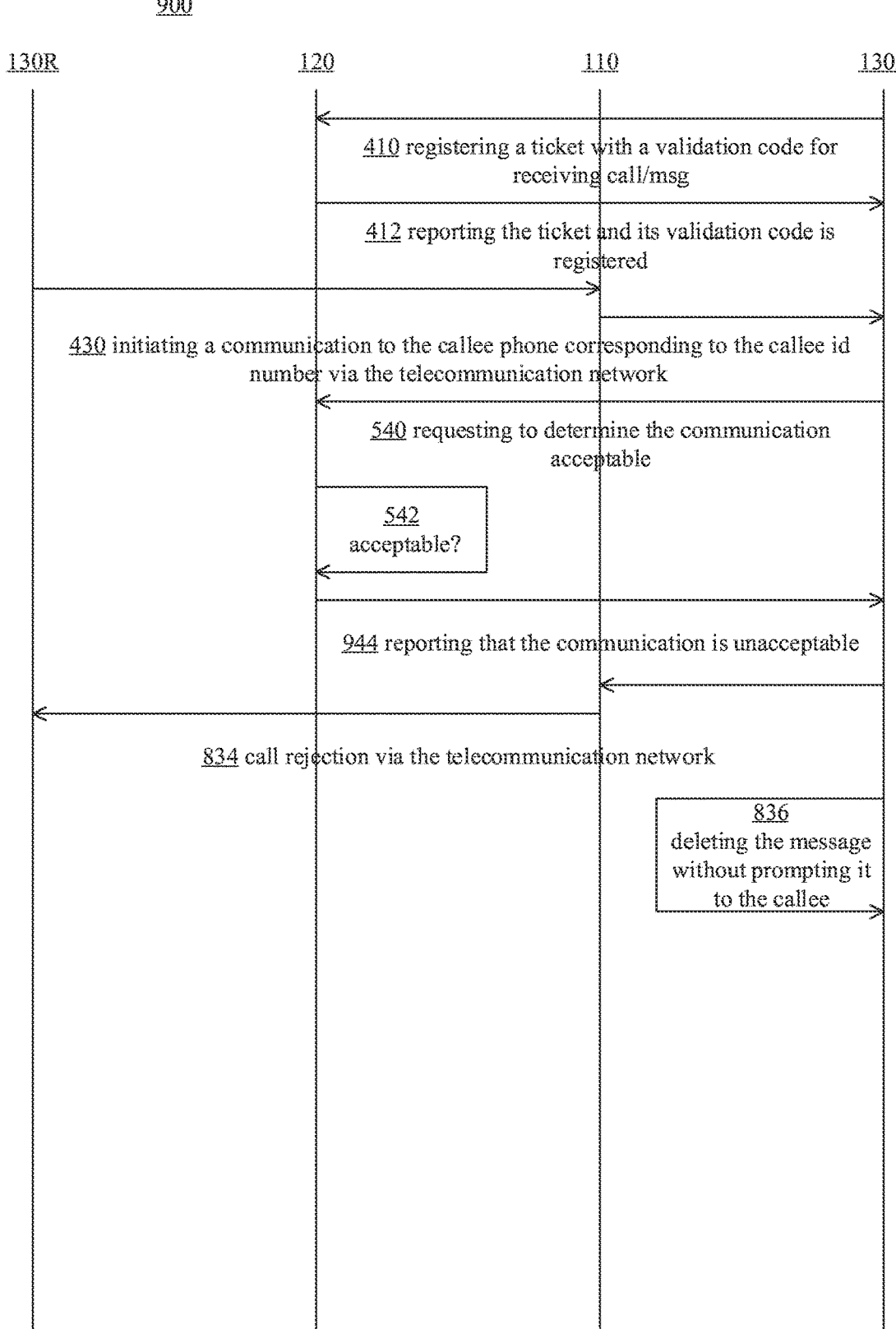

900

130R                    120                    110                    130E 410 registering a ticket with a validation code for
receiving call/msg 412 reporting the ticket and its validation code is
registered 430 initiating a communication to the callee phone corresponding to the callee id
number via the telecommunication network 540 requesting to determine the communication
acceptable 542
acceptable?

944 reporting that the communication is unacceptable 834 call rejection via the telecommunication network 836
deleting the message
without prompting it
to the callee

FIG. 9

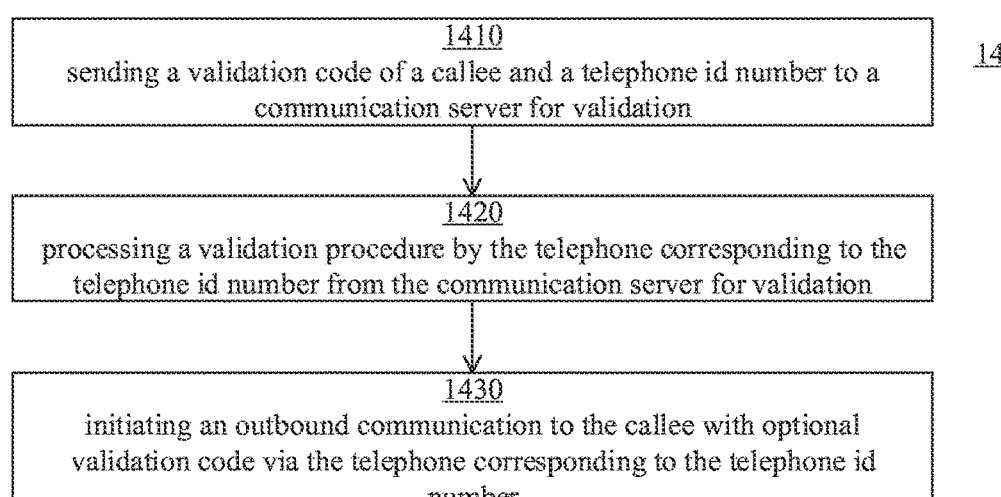

<p style="text-align: right">1400</p>

1410
sending a validation code of a callee and a telephone id number to a
communication server for validation 1420
processing a validation procedure by the telephone corresponding to the
telephone id number from the communication server for validation 1430
initiating an outbound communication to the callee with optional
validation code via the telephone corresponding to the telephone id
number

FIG. 14

CALLEE AND CALLER COMMUNICATION AND COMMUNICATION SERVICING METHODS

FIELD OF THE INVENTION

The present invention relates to telephonic filter, and more particularly, to a client-server telephonic filter mechanism.

BACKGROUND OF THE INVENTION

Telephonic conversations and message exchanges are daily activities in modern time. More and more harassing, advertisement or even fraud calls and messages seriously disrupt normal life and work. Precious time and plausible economic loss in answering the calls and messages.

Therefore, there exists a desire to have a telephonic filter to screen out unwanted inbound calls and messages. People can actively and promptly manage the inbound communications via the telephonic filter and treat their smart phones as safe communication tools.

SUMMARY OF THE INVENTION

An objective of the present invention is to provide a client-server mechanism for filtering unwanted inbound communication.

According to an embodiment of the present application, a callee communication method is provided. The callee communication method comprising: registering a ticket of a callee account with a validation code to a communication server; receiving an inbound communication corresponding to a caller id number from a telecommunication network; requesting the communication server to determine whether the inbound communication is acceptable according to the registered ticket; and when the communication server returns that the inbound communication is acceptable, prompting a callee to answer a call when a type of the inbound communication is call.

Preferably, in order to respond to the inbound communication, the callee communication further comprises one or any combination of following steps: when the communication server returns that the inbound communication is acceptable, prompting the callee a message when the type of the inbound communication is message; when the communication server returns that the inbound communication is unacceptable, rejecting the call when the type of the inbound communication is call; and when the communication server returns that the inbound communication is unacceptable, deleting the message when the type of the inbound communication is message.

Preferably, in order to provide more conditions for receiving the inbound communication, wherein the ticket further includes one or any combination of following properties: expiry time; available time windows; acceptable type of communication; and times of communication.

Preferably, in order to let the communication server determines whether the inbound communication is acceptable or not according to additional condition, wherein the requesting step further comprises sending one or any combination of following parameters to the communication server: the callee account; a type of the inbound communication; the caller id number; and local time when the requesting step is being performing.

Preferably, in order to let the callee have more information about the caller's intention, the callee communication method further comprises picking up the call when the type of the inbound communication is call; and one or any combination of following steps: transcribing a caller's speech into text and showing the transcribed text; playing the caller's speech; and playing the caller's video.

According to an embodiment of the present application, a caller communication method is provided. The caller communication method comprising: sending a validation code of a callee and a telephone id number to a communication server for validation; and when the validation code is accepted by the communication server, initiating an outbound communication to the callee via a telephone corresponding to the telephone id number and a telecommunication network which the telephone attaches to.

Preferably, in order to make sure that the telephone id number inputted by the caller is valid, the caller communication method further comprises after sending the validation code, processing a validation procedure by the telephone corresponding to the telephone id number from the communication server via the telecommunication network for validation.

Preferably, in order to let the telephone id number associating with correct ticket, the sending step further comprises sending a callee id number of the callee to the communication server.

Preferably, in order to let a normal telephone can initiate a call, wherein the sending step is not performed by the telephone corresponding to the telephone id number.

Preferably, in order to access the callee by call or message, wherein a type of the outbound communication is one of following: call and message.

According to an embodiment of the present application, a communication servicing method comprising: receiving a request from a callee account to check whether an inbound communication received by a callee phone via a telecommunication network is acceptable; determining whether a caller id number of the inbound communication is associated with a ticket registered by the callee account; and returning that the inbound communication is acceptable to the callee phone when the caller id number of the inbound communication is associated with the ticket registered by the callee account.

Preferably, in order to associate the ticket with inputted telephone number, before the receiving the request, the communication servicing method further comprises: receiving a registration of the ticket of the callee account with a first validation code; storing the registration of the ticket of the callee account; receiving a second validation code from a caller account corresponding to the caller id number; and associating the caller id number with the ticket when the first validation code is identical to the second validation code.

Preferably, in order to make sure that the telephone id number inputted by the caller is valid, the communication servicing method further comprises: validating a telephone corresponding to the caller id number via a telecommunication network; and determining whether the caller id number is valid or not according to the validating step, wherein the associating the caller id number with the ticket is performed when the caller id number is valid.

Preferably, in order to let the telephone id number associating with correct ticket, wherein the receiving the second validation code further comprises receiving a callee id number from the caller account, wherein the ticket is associated with the callee id number.

Preferably, in order to in order to let the communication server determines whether the inbound communication is acceptable or not according to additional condition, wherein the requesting further comprises receiving one or any combination of following parameters: the callee account; a type of the inbound communication; the caller id number; and local time of the callee phone.

Preferably, in order to provide more conditions for receiving the inbound communication, wherein the ticket further includes one or any combination of following properties: expiry time; available time windows; acceptable type of communication; and times of communication.

Preferably, in order to in order to let the communication server determines whether the inbound communication is acceptable or not according to additional condition, wherein the ticket further comprises at least one property, wherein the communication servicing method further comprises: returning that the inbound communication is acceptable when one or more parameters of the inbound communication meets the at least one property of the ticket registered by the callee account.

Preferably, in order to provide more conditions for receiving the inbound communication, wherein the ticket further includes one or any combination of following properties: expiry time; available time windows; acceptable type of communication; and times of communication.

Preferably, in order to associate non-expired ticket with the telephone id number, the communication servicing method further comprises associating the caller id number with the ticket when the first validation code is identical to the second validation code and when the ticket is not expired.

Preferably, in order to let public sectors can initiate communication to the callee, the communication servicing method further comprises: receiving and storing telephone id numbers of public sectors; and returning that the inbound communication is acceptable to the callee phone when the caller id number of the inbound communication is one of the stored telephone id numbers of public sectors.

In summarized, the present application provides a client-server mechanism for managing inbound communication to a callee. The callee may use registered tickets for conditioning inbound communications to a server and distribute validation codes of the registered tickets to potential callers who may have needs to communicate with the callee. The caller who indeed has needs must input a validation code before initiate a communication to the callee. The step can help to filter a large portion of unwanted or unnecessary inbound communications for the callee. Moreover, thanks to automatically rejecting calls or deleting messages provided by the present application, the callee can be free of harassment because the registered tickets may be expired.

BRIEF DESCRIPTION OF THE DRAWINGS

The advantages and spirit related to the present invention can be further understood via the following detailed description and drawings.

FIG. 9 illustrates a sequence diagram of a call sequence 900 in accordance with an embodiment of the present application.

FIG. 14 depicts a flowchart diagram of a caller communication method 1400 applicable to a caller in accordance with an embodiment of the present application.

DETAILED DESCRIPTION OF THE PREFERRED EMBODIMENT

Figure 1:
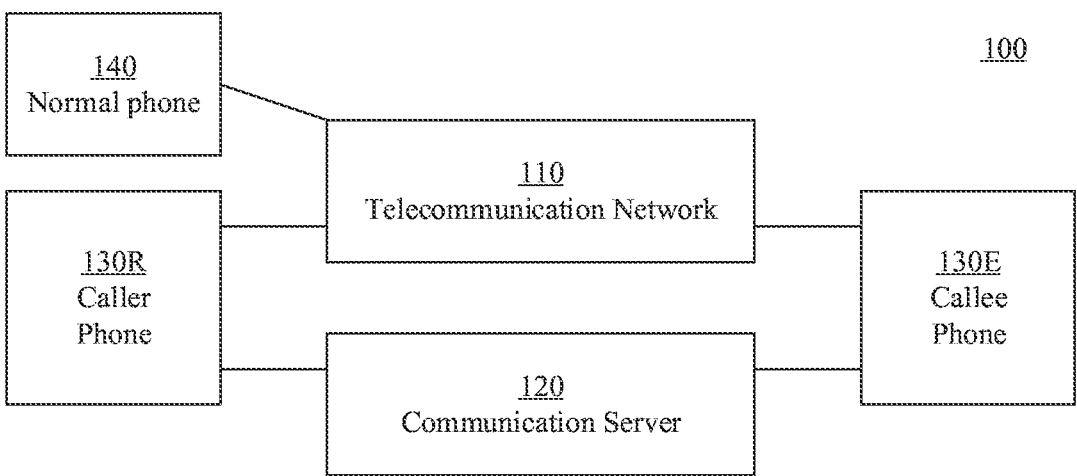
FIG. 1 depicts a block diagram of a telephonic filter system 100 in accordance with an embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

In order to facilitate a telephonic filter mechanism for screening unwanted disruptive telephonic calls, short and multimedia messages, the present application provides a client-server architecture to handle inbound telephonic phone calls and messages. Callers are authenticated and authorized to initiate phone calls and to send message to a callee, i.e., a user of the client-server architecture built on a data network. In addition to control who can make call or send message, the user can further control a time window for receiving call or message for a specified callee. Hence, users of the provided architecture can maximize their controls for the inbound calls or messages.

Please refer to FIG. 1, which depicts a block diagram of a telephonic filter system 100 in accordance with an embodiment of the present application. The telephonic filter system 100 may comprise a telecommunication network 110, a communication server 120, a caller phone 130R, a callee phone 130E and a normal phone 140. The normal phone 140 may belong to public sectors. The telecommunication network 110 may include one or many interconnected public telecommunication networks which are compliant to PSTN (Public Switch Telephone Network), 3GPP/ETSI 2G, 3G, 4G, 5G, and/or 6G wireless telecommunication standards, and INMARSAT satellite-based communication standards etc. which provides voice, data, and video telephonic call as well as short/multimedia message deliver services. The caller phone 130R, the callee phone 130E and the normal phone 140 all attaches to the one or many interconnected public telecommunication networks belong to the telecommunication network 110 by fixed lines or wirelessly. The caller phone 130R and the normal phone 140 can initiate telephonic calls to the callee phone 130E as long as the call initiators dial the subscriber number of the callee phone 130E. Thus, the callee would be bombarded by unwanted advertisement and fraud calls and messages from numerous unknown callers every day.

In order to protect the normal people of the telecommunication networks, the communication server 120 is configured for providing functions of maintaining valid user lists, synchronizing communication tickets with callee phones, and maintaining available phone numbers of public sectors. Please refer to FIG. 2, which shows a block diagram of the communication server 120 in accordance with an embodiment of the present invention. The communication server 120 may be implemented in a three-tier architecture, which includes a third tier of database management system 230, a second tier of business logic server 220, and a first tier of user interface server 210 such as a web server or an application interactive server. The three-tier architecture does not mean that there must be three physical computers to implement the three tiers individually. Person having ordinary skill in the art can understand that the three-tier architecture is an industrial standard definitions of software components. It does not require to implement them in three computers. For examples, the DBMS 230 may be one of non-relational databases (e.g. IBM Cloudant, InterSystems IRIS and Couchbase) and relational databases such as Oracle Database, DB2, MySQL, Microsoft SQL server etc. The business logic server 220 may be Oracle J2EE server, KingTayTay server, and Cloud BPM workflow etc.

The web server of the user interface server 210 is supposed to communicate with the web browser 250 installed in the client (i.e., the caller phone 130R and/or the callee phone 130E) in industrial standard HTML or XML. For example, well-known Apache web server may be used. The application interactive server may communicate with the Communication Application 240 installed in the client in proprietary protocols. The web server and application interactive server of the user interface server 210 are responsible for transmitting and receiving information to and from the client-side software. The information would be processed in the business logic server 220 according to business logics provided by the present patent application. Some information needs to be stored is sent to the DBMS 230 for storage. In response, the business logic server 220 may operate data retrieved from the DBMS 230 and produce outcomes to the user interface server which further format the outcomes and transmit them to the corresponding client-side software installed in the client, i.e., the caller phone 130R and/or the callee phone 130E.

Figure 3:
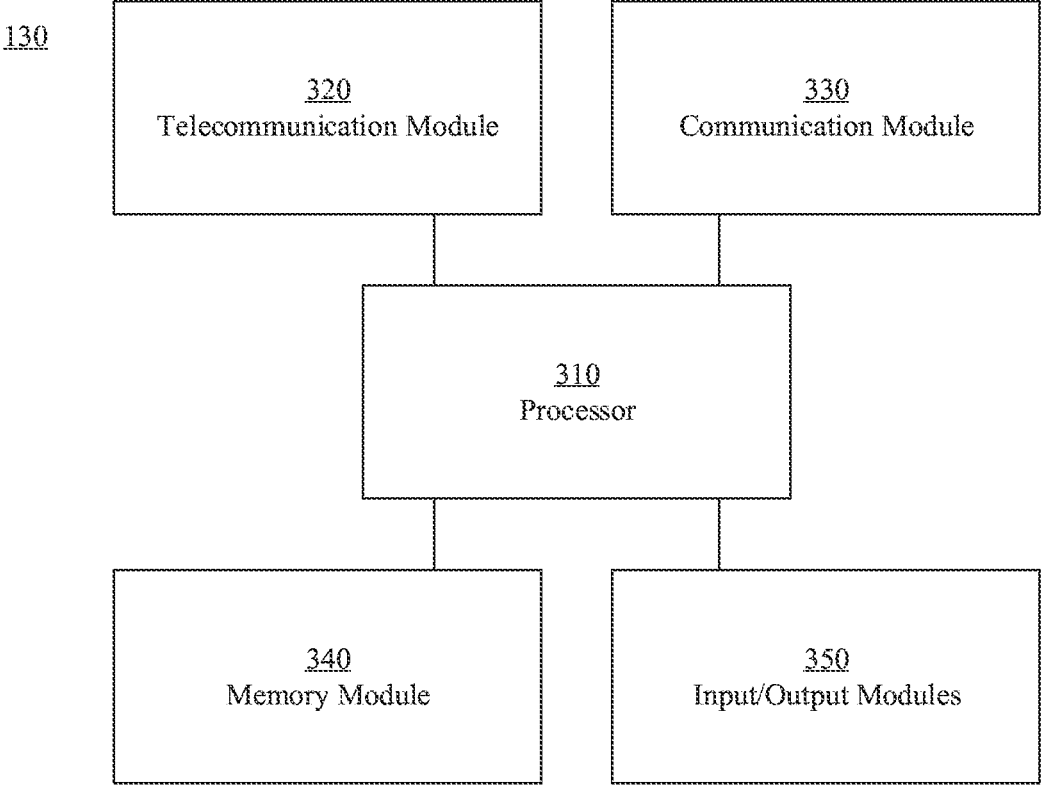
FIG. 3 illustrates a block diagram of a telephone 130 in accordance with an embodiment of the present invention.

Please refer to FIG. 3, which illustrates a block diagram of a telephone 130 in accordance with an embodiment of the present invention. The caller phone 130E and the callee phone 130E as shown in FIG. 1 may be instances of the telephone 130. This telephone 130 may be usually referred as a smart phone which runs an operating system and application programs. As shown in FIG. 3, the telephone 130 may comprise a processor 310 for controlling operations of the telephone 130, one or more telecommunication modules 320 for connecting to wireless telecommunication services, one or more communication modules 330 for connecting to wireless or wired communication service, a memory module 340 for storing instructions and data being operated by the processor 310 and one or more input/output modules 350 for receiving input from an user of the telephone 130 or for outputting signals to the user.

In one embodiment, the telecommunication module 320 may include hardware modules such as antenna, amplifier, filter, and modem for transmitting and receiving signals to wireless telecommunication services such as 2G, 3G, 4G, 5G and 6G industrial standard compliance networks and proprietary standard networks like Inmarsat and Starlink. via the telecommunication module 320, services such as audio and video telephonic service, text message service, multimedia message service and/or data service are provided to the telephone 130. The telecommunication module 320 may include analog front-end processing circuits and digital back-end processing circuits. The analog and digital circuits may include antennas, filters, operational amplifiers, power amplifiers, regulators, sampling circuits, dc-dc converters, delay circuits, embedded digital signal processors and associated firmware and memory. Person having ordinary skill in the art may have knowledges of telecommunication background to enable incorporations of the circuits for realizing the telecommunication module 320.

A universal unique subscriber number may be associated with a telecommunication service. In most cases, the subscriber number is represented or corresponding to a telephone number. When attaching to the subscribed telecommunication service via the telecommunication module 320, another telephone 130 can initiate an audio/video call or send message to this telephone 130 which is represented by the universal unique subscriber number or the telephone number. Reversely, this telephone 130 can initiate an audio/video call or send message to another telephone 130 which is also represented by another universal unique subscriber number or another telephone number. Usually, the caller would allow the telecommunication service provider to forward the subscriber number or the telephone number to the callee. The callee can decide to answer or to reject the call according to the forwarded subscriber number or the telephone number. For convenience, in the present application, the universal unique subscriber number or the telephone number are referred as an id number.

In one embodiment, the communication module 330 may include hardware modules such as antenna, amplifier, filter, and modem for transmitting and receiving signals to wireless or wired communication apparatus. The communication module 130 may follow local area network industrial standards such as IEEE 802.3, IEEE 802.11, and IEEE 1394 or pico/personal area network industrial standards such as Bluetooth, Near Field Communication and IrDA. Sometimes, the telephone 130 can access Internet via the communication module 330 and the connected network. The communication module 330 may include analog front-end processing circuits and digital back-end processing circuits. The analog and digital circuits may include antennas, filters, operational amplifiers, power amplifiers, regulators, sampling circuits, dc-dc converters, delay circuits, embedded digital signal processors and associated firmware and memory. Person having ordinary skill in the art may have knowledges of communication background to enable incorporations of the circuits for realizing the communication module 330.

In one embodiment, the memory module 340 may include volatile and non-volatile memories such as static random-access memory, dynamic random-access memory, EEPROM, flash ROM and/or any other persistent or non-persistent memory media. Instructions and data are stored in the memory module 340. The type of the input/output module 350 may be switch, button, keyboard, mouse, touch panel, touch screen, display, light, speaker, microphone, camera, vibrator or Global Navigational Satellite Services receiver etc. Under the control of the processor 310, the input/output modules 350 are configured to receiving input from a user of the telephone 130 or for outputting signals to the user.

Usually, three application programs including an audio/video call program, a message program and a contact book program are default installed in the telephone 130. All of these share a common contact book stored in the memory module 340. There are tuples in the contact book. In each tuple, a contact information including a name of the contact and the id number are recorded. Optional information related to the contact such as address, email address, tile, birthday may be also put into the same tuple. The contact book program is supposed to manage the tuples. Operations include add, delete, search, and modify on the tuples are manipulated by the contact book program following the user's commands. The call program and the message program also take advantage of the tuples in the contact book for taking a call/message to or receiving a call/message from a contact tuple. Of course, the call program and the message program are also supposed to handle calls and messages from and to those id numbers missed in the contact book.

The present application provides a communication application in accordance with an embodiment. The application program is supposed to be run under the operating system environment of the telephone 130. After being installed, the communication application begins an initial configuration step to learn about information of the particular telephone 130. Some or all of the required information may be provided automatically by the operating system run by the telephone 130 or be inputted by the user of the telephone 130 via the input/output modules 350. Besides, the communication application also requests privileges to access the telecommunication module 320 and the communication module 330. Once the requested privileges are granted, the communication application can operate to implement inventive steps provided by the present application.

The communication application is able to connect to the user interface server 210 or the communication server 120 by utilizing the communication module 330 and/or the telecommunication module 320 and their attached networks. A caller or a callee may install the communication application in their phones 130. However, the normal phone 140 may not have the communication application installed. A callee is supposed to be a user of the provided communication server 120 which maintains user data. There is a user account corresponding to the callee maintained by the communication server 120. The user account may be uniquely identified by the id number of the callee.

In order to filter out unwanted inbound calls or messages, the caller may register a communication ticket in the provided system 100 and give the ticket to a caller who is authorized to initiate calls and/or to send messages to the callee. The communication ticket associated with the user account of the callee includes a validation code which may be composed by numeric and alphabetic symbols. A name may be given to a ticket. In addition, the callee may set up some properties of the ticket. In some embodiment, the ticket may have an expiry date, times, or available time window. For example, a ticket may be used to initiate call to the callee during business hours, i.e., 09:00-18:00, Monday to Friday. Another ticket may be used to call the callee during nights or weekends. A ticket for vacation may be used during summer vacation or July even it is registered in December. Some tickets may be used to make call, and some tickets are only used for sending messages. A one-time-only ticket may be used to have one successful call with the callee. The callee may register, modify, search, review and delete his/her tickets in the communication application installed in the callee phone 130E. These actions corresponding to the tickets would be recorded and maintained by the communication server 120.

A potential caller may learn the validation code of the communication ticket and the id number of the callee printed in a business card of the callee or anywhere. The caller may install the communication application and create a user account on the communication server 120 via the installed communication application. The user account of the caller is associated with the id/subscriber number of the caller. In case the caller inputs the received validation code and id number of the callee via the application or the web browser, the communication server 120 compares the inputted callee id and the validation code with existing records of tickets. Once the result is a match, the caller account is authorized according to the ticket and optional properties. Some properties of the ticket may be available or viewable to the authorized caller. However, some properties of the ticket may be hidden by the communication server 120. The caller may perform authorized actions after that.

Figure 4:
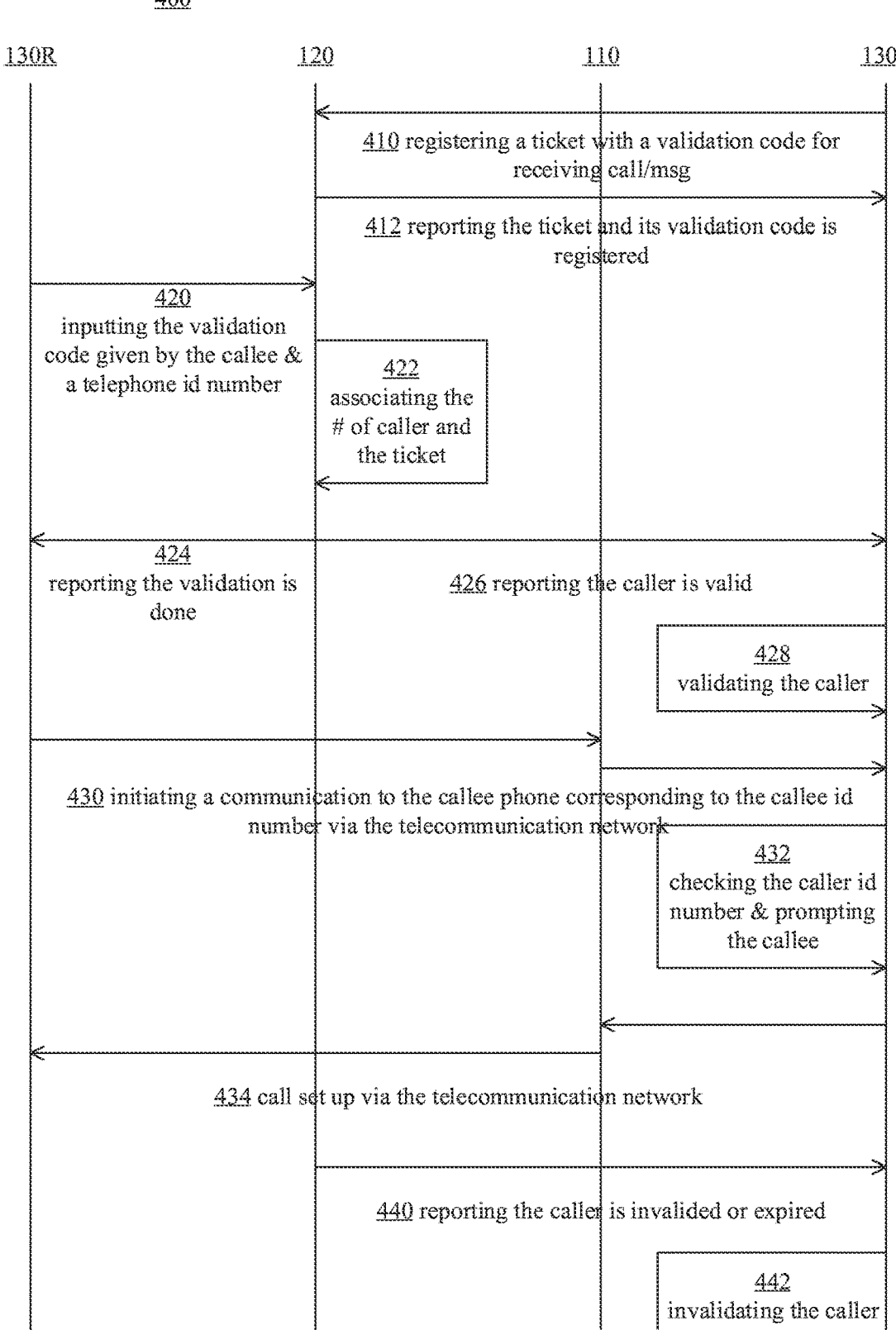
FIG. 4 illustrates a sequence diagram of a call sequence 400 in accordance with an embodiment of the present application.

Please refer to FIG. 4, which illustrates a sequence diagram of a call sequence 400 in accordance with an embodiment of the present application. There are four roles 110, 120, 130E and 130R illustrated in FIGS. 1 and 4. If no other description provided, aforementioned descriptions of these four blocks 110, 120, 130E and 130R are also applicable to the roles 110, 120, 130E and 130R, respectively. The call sequence 400 may begin at step 410.

Step 410: a callee, who already owns a user account of the system 100, operates the callee phone 130E for registering a ticket with a validation code for receiving calls/messages. The callee may configure one or many properties of the ticket.

Step 412: the communication server 120 is configured to store the registration of the communication ticket and the optional properties set up by the callee. Once the process is done, the communication server 120 is supposed for reporting the ticket and its validation code are successfully registered to the callee phone 130E. Because the callee account may be associates with a callee id number, the communication server 120 may also set up a link between the ticket and the callee id number. Steps 410 and 412 may be operated on the communication application or the web browser of the callee phone 130E.

Step 420: a caller, who receives the callee id number and the validation code given by the callee, inputting the validation code and a telephone id number of the caller to the communication server 120. Optionally, the caller may also input the callee id number with the validation code to the communication server 120.

Step 422: after receiving the validation code and the telephone id number or the caller id number inputted by the caller at step 420, the communication server 120 compares the validation code with the existing records and finds that the inputted validation code is matched with one validation code of one of the stored tickets. Consequently, the communication server 120 is configured for associating the telephone/caller id number provided by the caller with the callee account in view of the found ticket corresponding to the callee account. If two callees register two separate tickets with an identical validation code, the optionally inputted callee id number at step 420 is used to distinguish which ticket or which callee should be associated with the telephone id number provided by the caller.

Step 424: the communication server 120 is configured for reporting that the validation is done to the caller phone 130R. In one embodiment, the communication application of the caller phone 130R may denote that the callee id number is available.

Step 426: the communication server 120 is configured for reporting that the caller is valid in view of the ticket to the callee phone 130E. The communication application installed in the callee phone 130E may add the caller id number in a valid caller list. Furthermore, the caller id number may be further associated with the corresponding ticket.

Step 428: in response to the reporting at step 426, the communication application installed in the callee phone 130E is configured for validating the caller with its id number stored in the memory module 340.

Step 430: the caller directs that the caller phone 130R for initiating a communication to the callee phone corresponding to the callee id number via the telecommunication network 110. A type of the communication may be call (voice call or video call) or message (text, audio, or video messages). In one embodiment, the call may be initiated by original call program installed in the caller phone 130R. Alternatively, the call may be initiated by the communication application provided by the present application installed in the caller phone 130R. Similarly, the message may be sent by original message program installed in the caller phone 130R. Alternatively, the message may be sent by the communication application provided by the present application installed in the caller phone 130R.

In one embodiment, the communication application installed in the caller phone 130R may automatically add the validation code corresponding to the callee id number to the message. For example, the validation code may be inserted to a leading part of the message. Alternatively, the caller may manually add the validation code in the message to be sent.

Step 432: after receiving the inbound communication with the caller id number from the telecommunication network 110, the communication application installed in the callee phone 130E would check whether the caller id number is in the valid caller list. In case the caller id number is not in the valid caller list, the communication application would reject the call without prompting it to the callee. On the contrary, when the caller id number is in the valid caller list, the communication application may further find out the ticket and its properties which are associated with the caller id number. If the call does not satisfy any one of the properties of the associated ticket, the communication application may also reject the call without prompting it to the callee. If the call does meet the properties of the associated ticket, the communication application would prompt the callee that a call is inbound. Once the callee decides to pick up the inbound call, the flow goes to step 434.

Similarly, after receiving the message with the caller id number from the telecommunication network 110, the communication application installed in the callee phone 130E would check whether the caller id number is in the valid caller list. In case the caller id number is not in the valid caller list, the communication application would delete or hide the message without prompting it to the callee. On the contrary, when the caller id number is in the valid caller list, the communication application may further find out the ticket and its properties which are associated with the caller id number. If the message does not meet all of the properties of the associated ticket, the communication application may also delete or hide the message without prompting it to the callee. If the message does meet the properties of the associated ticket, the communication application would prompt the callee that a message is received.

In one embodiment, the communication application may further check whether the message includes the validation code of the corresponding ticket. If the message does not include the validation code of the corresponding ticket, the communication application would delete or hide the message without prompting it to the callee.

Step 434: After the callee picks up the call, a call set up process would be performed by the telecommunication network 110. The caller phone 130R and the callee phone 130E would be connected via the telecommunication network 110.

Optional step 440: the communication server 120 may perform housekeeping operations to find out whether the tickets are expired or whether the caller account is invalid. In case, a ticket is determined being expired or a caller is determined invalid, the communication server 120 would notify the communication application installed in the callee phone 130E.

Optional step 442: after receiving the notification from the communication server 120, the communication application installed in the callee phone 130E may delete the caller associated with the expired ticket or the invalid caller in the valid caller list.

In the embodiment as shown in FIG. 4, the communication application installed in the callee phone 130E maintains local copies of tickets and valid caller list. Thus, when an inbound communication is received, the communication application is able to deal with the inbound communication by itself. However, the data stored in the communication server 120 and the callee phone 130E may be inconsistent due to infrequent synchronization steps. Therefore, in alternative embodiments, the communication application may solely rely on the data stored in the communication server 120.

Figure 5:
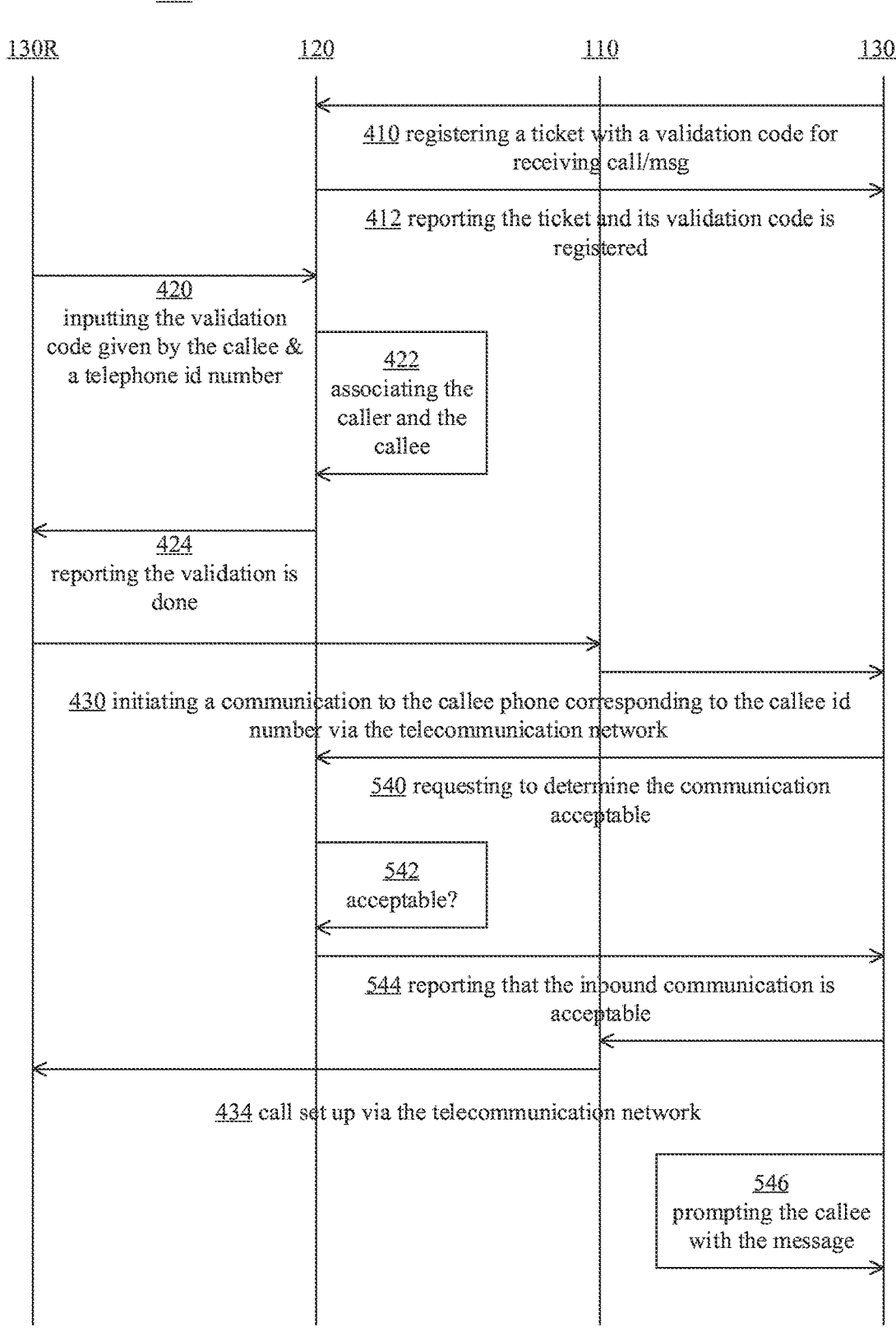
FIG. 5 illustrates a sequence diagram of a call sequence 500 in accordance with an embodiment of the present application.

Please refer to FIG. 5, which illustrates a sequence diagram of a call sequence 500 in accordance with an embodiment of the present application. The call sequence 500 as shown in FIG. 5 is a variant of the embodiment as shown in FIG. 4. Previous descriptions to steps with same numerals as shown in FIG. 4 may be applicable to the call sequence 500. Since the data are stored in the communication server 120, the communication application installed in the callee phone 130E would have to consult the communication server 120 when an inbound communication is received. Thus, the steps 426 and 428 are omitted in the call sequence 500.

Step 540: in case a call or a message is inbound from the telecommunication network 110, the communication application installed in the callee phone 130E would send a request to the communication server 120 to determining whether the inbound communication meets at least one ticket and its properties. The request may include parameters of the inbound communication such as the callee user account, type of communication (i.e., call or message), the caller id number and/or local time of the callee phone 130E.

Step 542: after receiving the request sent by the callee phone 130E, the communication server 120 determines whether the inbound communication meets any ticket and its properties. For example, the communication server 120 may check whether the caller id number is associated with the existing tickets of the callee account. If the caller id number of the inbound communication is already associated with a ticket of the callee account, the communication server 120 may further determine whether parameters of the inbound communication meet properties of the associated ticket. When the parameters of the inbound communication meet properties of the associated ticket, the communication server 120 determines that the inbound communication is acceptable. Otherwise, the communication server 120 determines that the inbound communication is unacceptable when there is no associated ticket with the caller id number or when the parameters do not meet properties of the associated ticket.

Step 544: the communication server 120 is configured for reporting whether the inbound communication is acceptable or not in view of tickets to the callee. In case that it is not acceptable, the communication application may reject the call or delete the message. On the contrary, in case that the requested call is acceptable, the communication application may prompt the callee that a call is inbound. If the callee picks up the call, the flow may proceed to step 434. In case that the requested message is acceptable, the flow may proceed to step 546.

Step 546: the communication application is configured for prompting the callee with the message.

In the embodiments and their variants as shown in FIGS. 4 and 5, the caller uses his/her caller phone 130E to initiate a call or to send a message to the callee. Thus, the call and the message are labeled with the id number of the caller phone 130E which is already validated by the communication server 120. The communication application installed in the callee phone 130E would accept the call or the message. However, when the caller uses another telephone (e.g., land-lined home telephone or company telephone) to initiate a call, the call which is labeled with another telephone id number would be rejected by the communication application installed in the callee phone 130E. Moreover, the home telephone and the company telephone may not be smart-phone. The caller is unable to download and install the communication application to a normal telephone. In order to let the call initiated or the message sent by a normal telephone is acceptable by the callee, the communication server 120 may have a validation procedure to the normal telephone.

Figure 6:
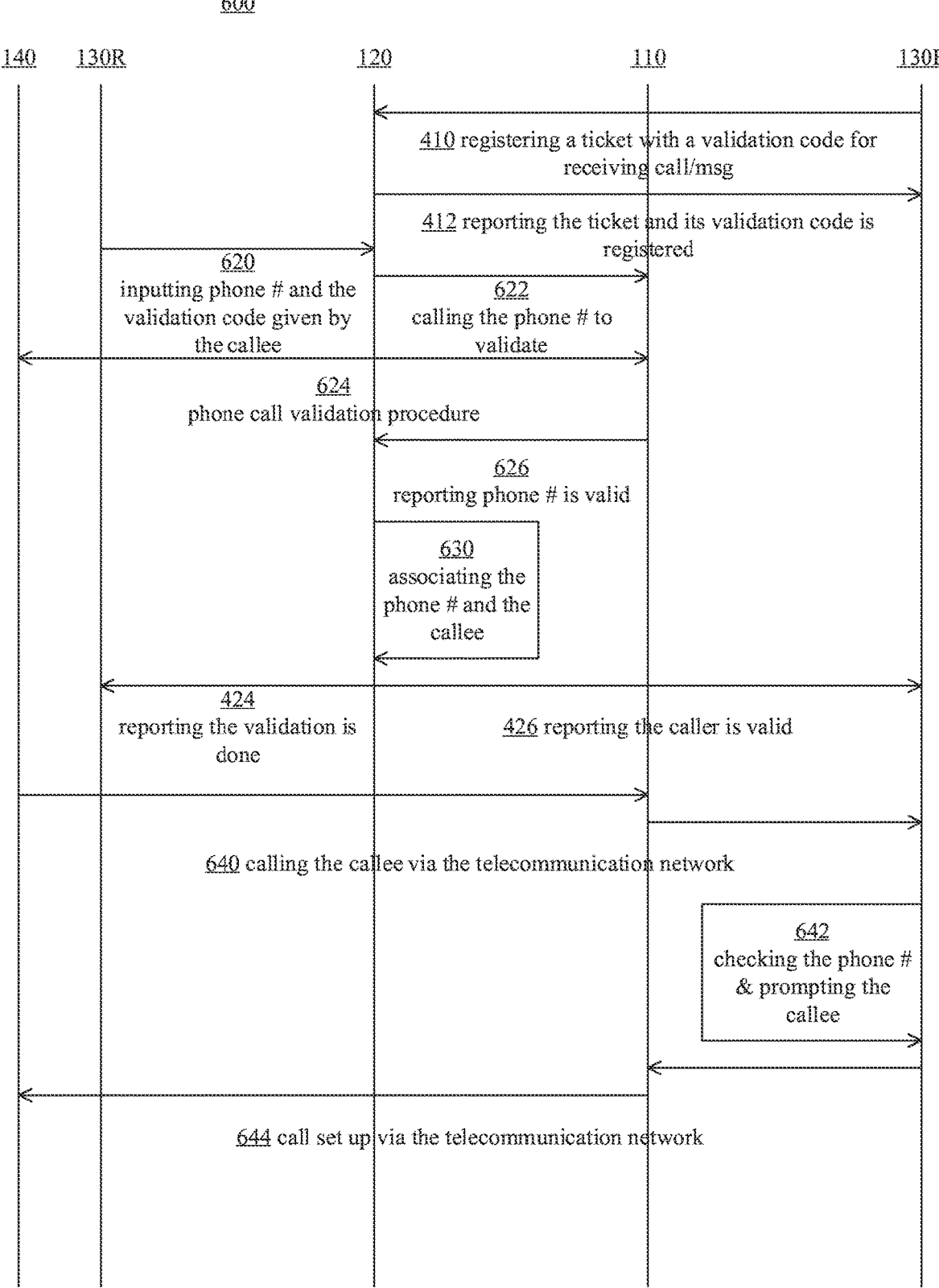
FIG. 6 illustrates a sequence diagram of a call sequence 600 in accordance with an embodiment of the present application.

Please refer to FIG. 6, which illustrates a sequence diagram of a call sequence 600 in accordance with an embodiment of the present application. The call sequence 600 as shown in FIG. 6 is a variant of the embodiment as shown in FIG. 4. Previous descriptions to steps with same numerals as shown in FIG. 4 may be applicable to the call sequence 600.

Step 620: the caller may input a phone id number and the validation code given by the callee to the communication server 120. This step may be performed by the communication application or on the web browser installed in the caller phone 130R. However, the step may be done on web browser of any computer.

Step 622: the communication server 120 may compare the validation code with the existing validation codes of stored tickets. If there is a match, the communication server 120 would initiate a call to the received telephone id number via the telecommunication network 110.

Step 624: the telecommunication network 110 can connect the communication server 120 with the telephone that the caller specified when the caller picks up the call. A validation procedure may be performed automatically by the communication server 120. The communication server 120 may challenges the caller on the specified telephone. For example, the communication server 120 may ask the caller to press some dial buttons which produce DTMF (Dual Tone Multiple Frequency) voice signals. In another example, the communication server 120 may ask the caller to say his/her account name or information known by the communication server 120. After receiving speech of the caller, a voice recognition process performed by the communication server 120 is able to determine whether the caller say what is requested. If the communication server 120 does receive what it wants to hear, the validation of the telephone id number is passed. In one example, even when a call to the telephone 140 is picked up in this step 624, it may represent that the validation procedure is done.

Step 626: the telecommunication network 110 may send a signal for reporting that the telephone id number is valid. In one embodiment, a signal (may be compliant to well-known Signaling System No. 7) is provided by the telecommunication network 110 for reporting that the telephone id number is valid.

Step 630: in case the telephone id number is validated at step 624 and/or the signal is received at step 626, the communication server 120 is configured for associating the telephone id number with the callee account in view of the found ticket. Subsequently, the caller phone 130R and the callee phone 130E may be notified that the telephone id number is validated at steps 424 and 426, respectively.

Step 640: after the telephone id number is validated, the caller may initiate a call to the callee phone 130E from the telephone 140 corresponding to the telephone id number via the telecommunication network 110.

Step 642: after receiving the call with the telephone id number, the communication application installed in the callee phone 130E would search the telephone id number in the valid caller list. In case the telephone id number is added into the valid caller list at previous step 426, the communication application may further check whether parameters of the call meets properties of the corresponding ticket. When the call does meet properties of the corresponding ticket, the communication application would prompt to the callee that a valid call is inbound. Otherwise, the communication application would reject the call. If the callee decides to pick up the call, the call sequence 600 proceeds to step 644.

Step 644: After the callee picks up the call, a call set up process would be performed by the telecommunication network 110. The normal phone 140 and the callee phone 130E would be connected.

Figure 7:
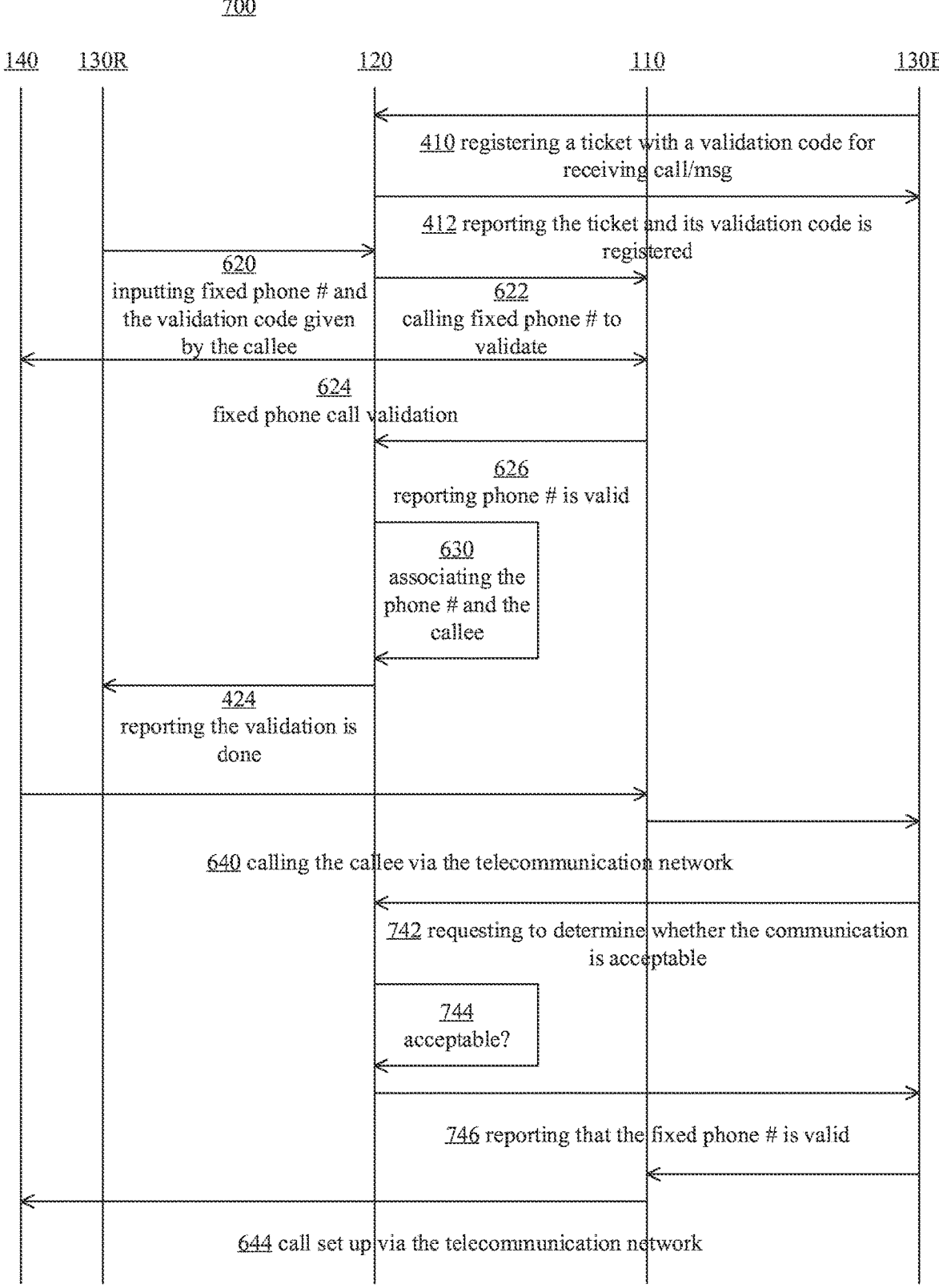
FIG. 7 illustrates a sequence diagram of a call sequence 700 in accordance with an embodiment of the present application.

Please refer to FIG. 7, which illustrates a sequence diagram of a call sequence 700 in accordance with an embodiment of the present application. The call sequence 700 as shown in FIG. 7 is a variant of the embodiments as shown in FIGS. 5 and 6. Previous descriptions to steps with same numerals as shown in FIGS. 4-6 may be applicable to the call sequence 700. Since the data are stored in the communication server 120, the communication application installed in the callee phone 130E would have to consult the communication server 120 when a call or a message is inbound. Thus, the steps 426 and 428 are omitted in the call sequence 700.

Step 742: after receiving the call with the telephone id number, the communication application installed in the callee phone 130E would send a request to the communication server 120 to determining whether the call or the message meets at least one ticket and its properties. The request may include parameters of the call such as the callee user account, type of communication (i.e., call or message), the telephone id number and/or local time.

Step 744: after receiving the request sent by the callee phone 130E, the communication server 120 checks whether parameters of the call meets any ticket and its properties.

Step 746: the communication server 120 is configured for reporting whether the inbound communication is acceptable or not in view of a ticket to the callee. In case that it is not acceptable, the communication application may reject the call. On the contrary, in case that the requested call is acceptable, the communication application may prompt the callee that a call is inbound. If the callee picks up the call, the flow may proceed to step 644.

Figure 8:
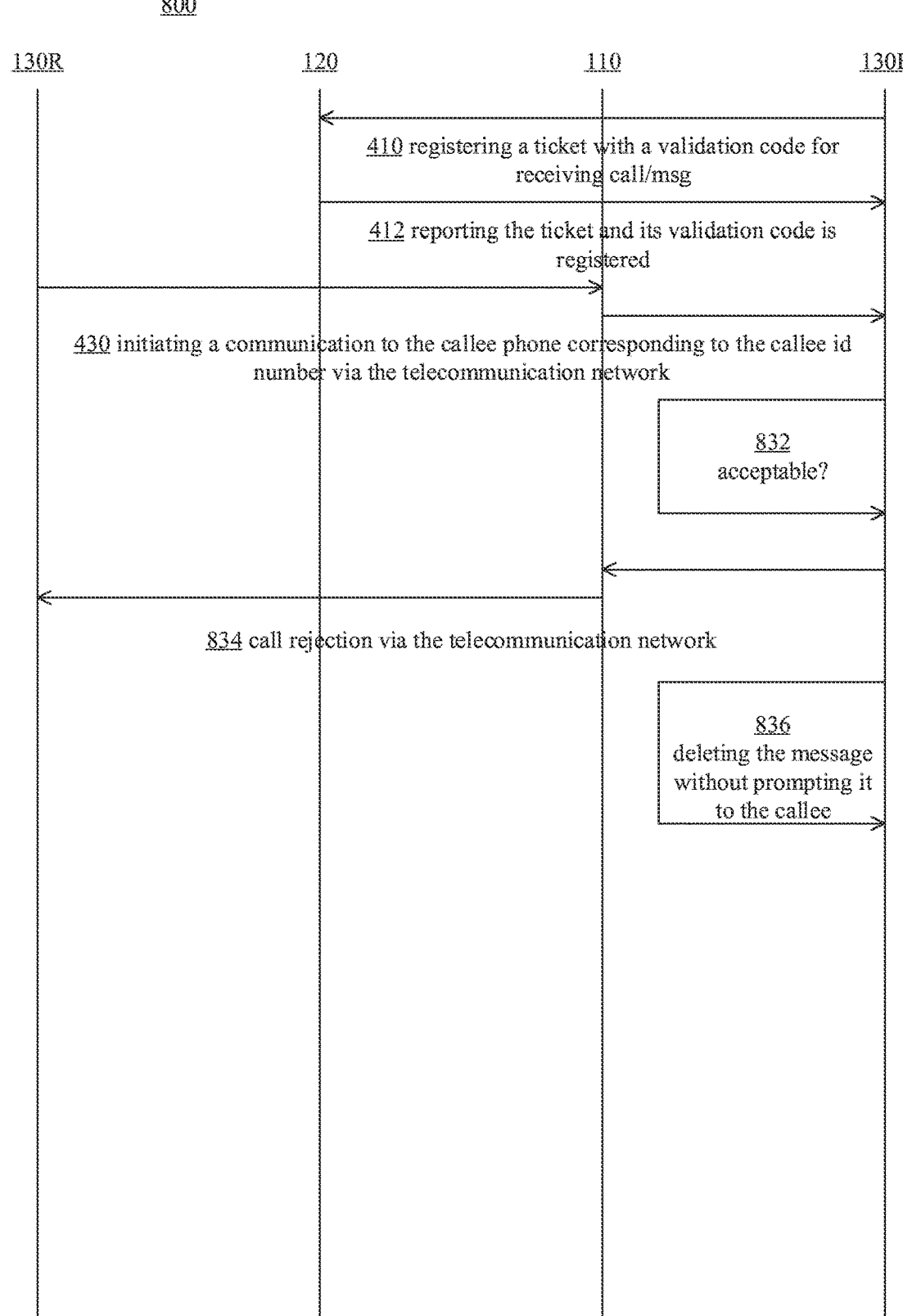
FIG. 8 illustrates a sequence diagram of a call sequence 800 in accordance with an embodiment of the present application.

In the embodiments as shown in FIGS. 4-7, the telephone id number of the inbound communication are valid. As shown in FIGS. 8 and 9, call sequence diagrams depict what happens when the telephone id number of the inbound communication are not valid. Please refer to FIG. 8, which illustrates a sequence diagram of a call sequence 800 in accordance with an embodiment of the present application. The call sequence 800 as shown in FIG. 8 is a variant of the embodiments as shown in FIG. 4. Previous descriptions to steps with same numerals as shown in FIG. 4 may be applicable to the call sequence 800. The callee phone 130E as shown in the call sequence 800 keeps its own copies of tickets and valid caller id list. Therefore, after receiving an inbound communication at step 430, the call sequence 800 proceeds to step 832.

Step 832: after receiving the inbound communication with a caller id number from the telecommunication network 110, the communication application installed in the callee phone 130E would check whether the caller id number is in the valid caller list. In case the caller id number is not in the valid caller list, the communication application would reject the call without prompting it to the callee. On the contrary, when the caller id number is in the valid caller list, the communication application may further find out the ticket and its properties which are associated with the caller id number. If parameters of the call does not meet properties of the associated ticket, the communication application may also reject the call without prompting it to the callee. In both cases, the call sequence 800 proceeds to step 834.

Similarly, after receiving the message with the caller id number from the telecommunication network 110, the communication application installed in the callee phone 130E would check whether the caller id number is in the valid caller list. In case the caller id number is not in the valid caller list, the flow would proceed to step 836. On the contrary, when the caller id number is in the valid caller list, the communication application may further find out the ticket and its properties which are associated with the caller id number. If parameters of the message does not meet the properties of the associated ticket, the flow may also proceed to step 836.

Step 834: rejecting the inbound call via the telecommunication network.

Step 836: deleting or hiding the inbound message without prompting it to the callee.

Please refer to FIG. 9, which illustrates a sequence diagram of a call sequence 900 in accordance with an embodiment of the present application. The call sequence 900 as shown in FIG. 9 is a variant of the embodiments as shown in FIGS. 4, 5, and 8. Previous descriptions to steps with same numerals as shown in FIGS. 4, 5, and 8 may be applicable to the call sequence 900. Since the data are stored in the communication server 120, the communication application installed in the callee phone 130E would have to consult the communication server 120 when a call or a message is inbound. Thus, the steps 426 and 428 are omitted in the call sequence 700. After receiving an inbound call or message, the call sequence proceeds to steps 540 and 545. At step 545, the communication server 120 finds that there is no matched ticket corresponding to the callee with regard to the inbound call or message. The call sequence 900 proceeds to step 944.

Step 944: the communication server 120 is configured for reporting that the inbound communication is unacceptable. After receiving the report, the communication application installed in the callee phone 130E may perform step 834 or step 836.

In the previous embodiments, the communication application installed in the callee phone 130E would reject calls or messages when id numbers of call initiators or message senders are not included in the valid caller list. If a government agency or a utility company initiate calls or sends messages to the callee, the provided system 100 would provide a mechanism to let the inbound calls or messages from public sectors passing through and reaching the callee.

Figure 10:
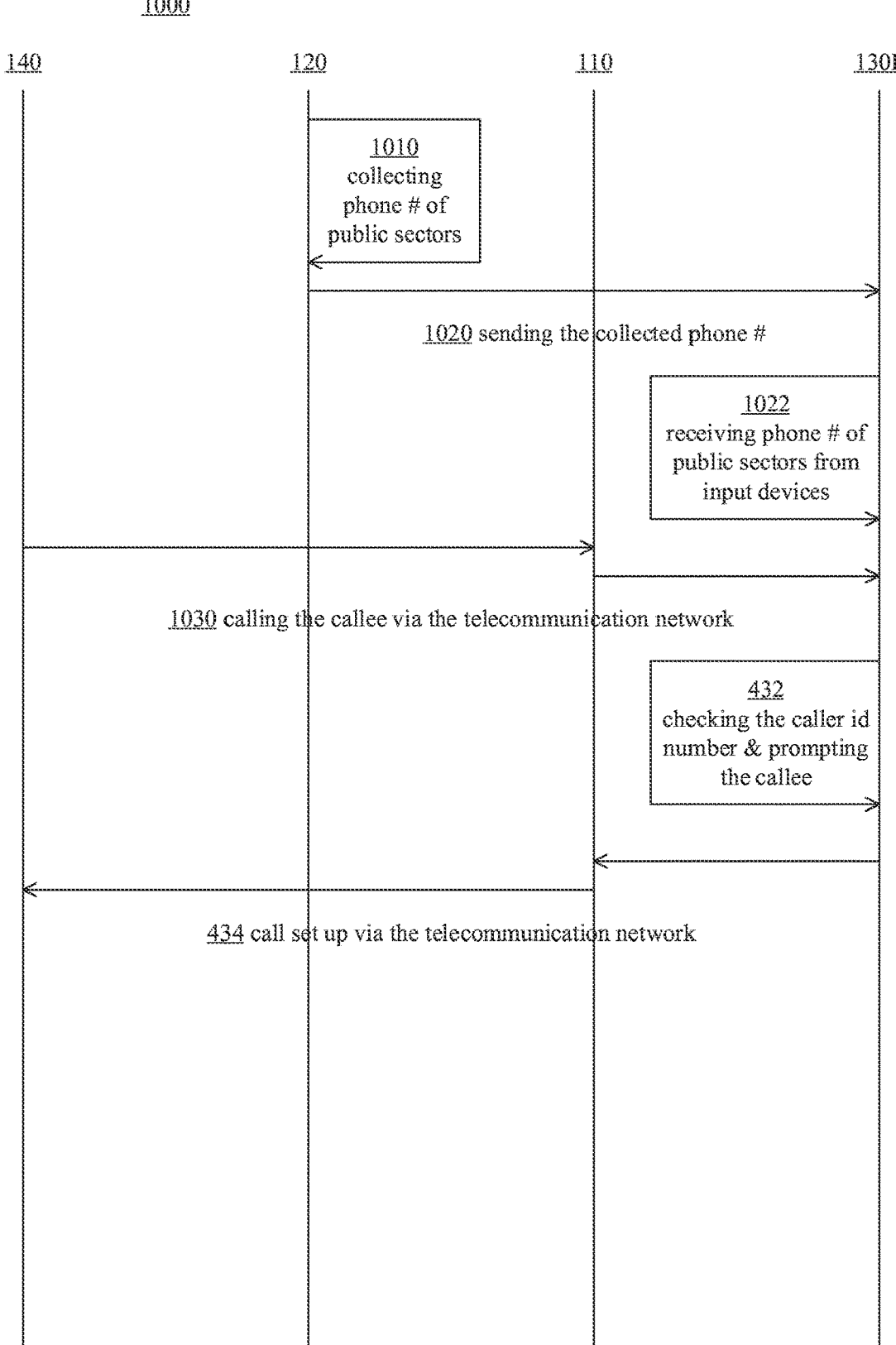
FIG. 10 illustrates a sequence diagram of a call sequence 1000 in accordance with an embodiment of the present application.

Please refer to FIG. 10, which illustrates a sequence diagram of a call sequence 1000 in accordance with an embodiment of the present application. In this embodiment, the communication application installed in the callee phone 130E keeps its own copy of data. The call sequence 1000 may begin at step 1010.

Step 1010: the communication server 120 may be configured for collecting, storing and/or updating phone numbers of public sectors in a public valid caller list. For example, the public sectors may include police departments, fire departments, public schools, utility companies, government institutes etc. The call sequence 1000 may proceeds to step 1020:

Step 1020: the communication server 120 is configured for sending the collected telephone numbers in the public valid caller list to the callee phone 130E. In order to keep the public valid caller list stored in the callee phone 130E smaller, the communication server 120 may send part of the public valid caller list to the callee phone 130E based on a location of the callee phone 130E. For example, if the callee phone 130E is generally located in a specified county, the communication server 120 may send the telephone numbers in the public valid caller list corresponding to the specified county mandatory. However, the communication 120 may also send other telephone numbers in the public valid caller list corresponding to another county in demand or optionally. In an example, when the callee phone 130E is roamed into another county, the communication application may demand the communication server 120 to patch the public valid caller list corresponding to the county where it roamed into. The communication application stored in the callee phone 130E would update a local copy of the valid caller list.

Optional step 1022: the communication application installed in the callee phone 130E may be configured for receiving telephone numbers of public sectors from input devices of the callee phone 130E.

Step 1030: a caller initiates a call by a normal phone 140 of a public sector to the callee via the telecommunication network 110. Thus, the call sequence 1000 proceeds to aforementioned step 432. If the caller decides to pick up the call, the call sequence 1000 further proceeds to aforementioned step 434.

Figure 11:
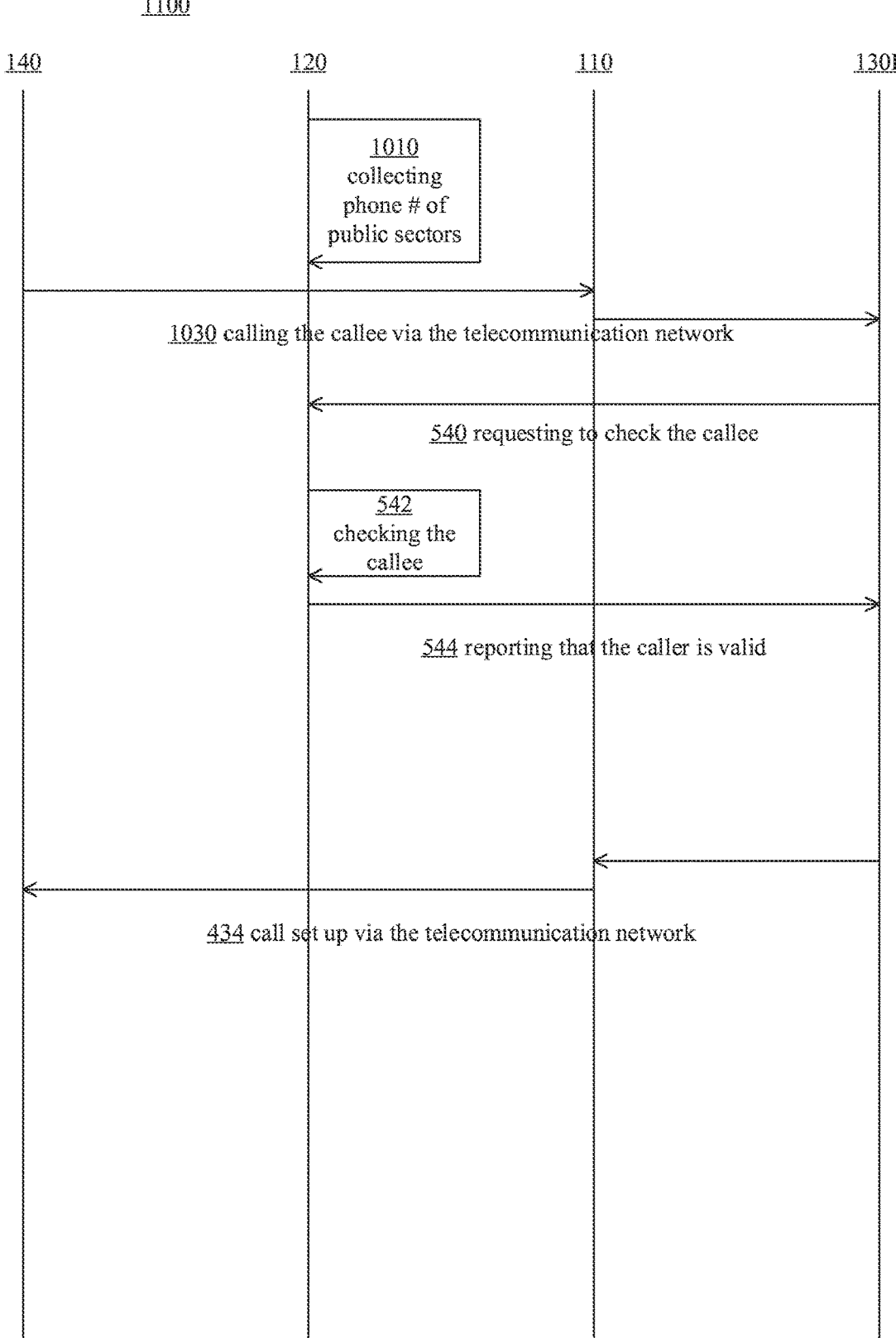
FIG. 11 illustrates a sequence diagram of a call sequence 1100 in accordance with an embodiment of the present application.

Please refer to FIG. 11, which illustrates a sequence diagram of a call sequence 1100 in accordance with an embodiment of the present application. The call sequence 1100 is a variant of the embodiment as shown in FIG. 10. In this embodiment, the communication application installed in the callee phone 130E does not maintain its own copy of the valid caller list. Thus, after step 1010, the communication server 120 does not send part or all of the telephone numbers of public sectors to the callee phone 130E.

After step 1030, the call sequence 1100 would proceed to steps 540, 542 and 544. After step 544, if that the callee decides to pick up the inbound call, the flow goes to step 434.

Figure 12A:
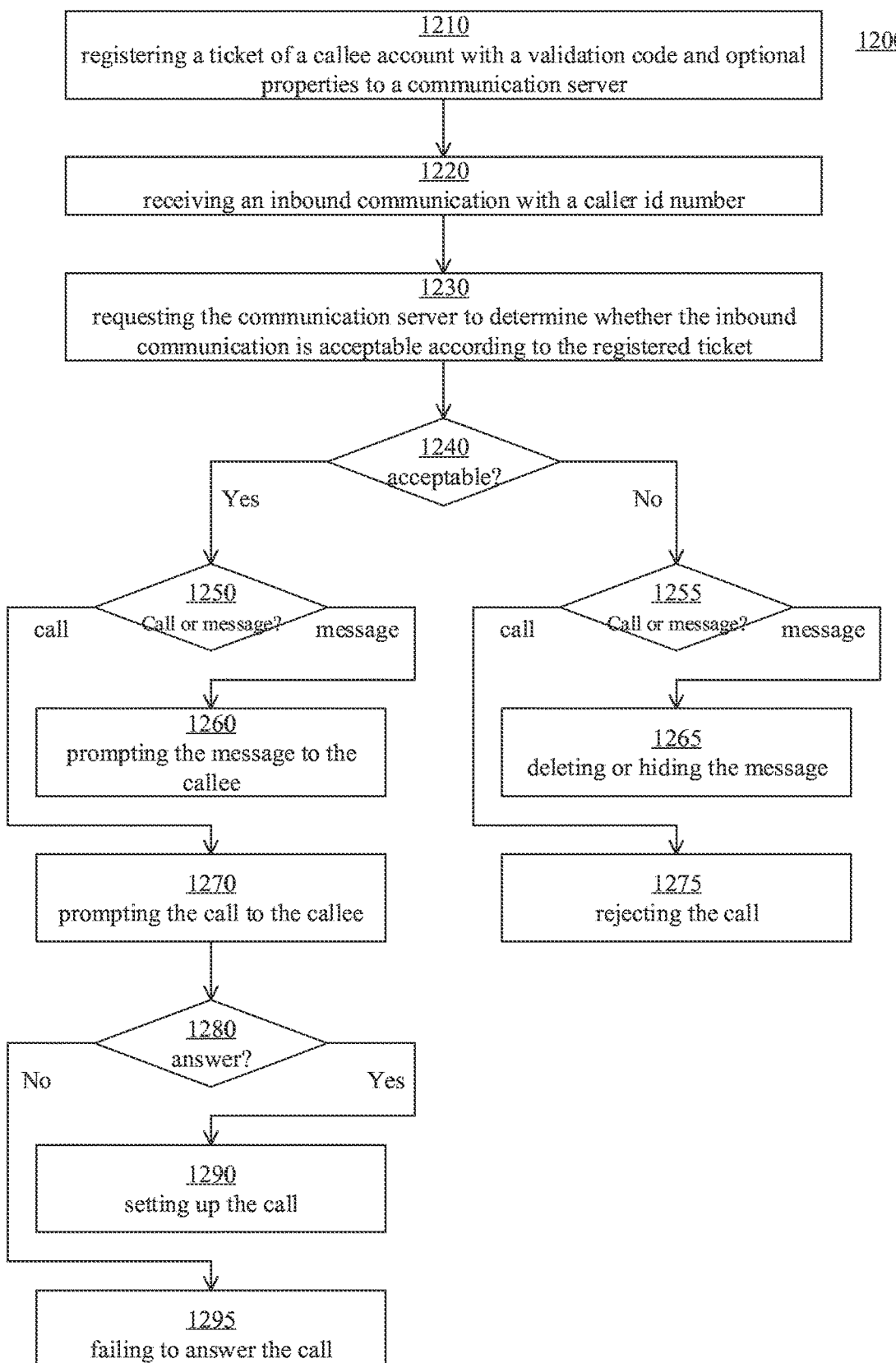
FIG. 12A depicts a flowchart diagram of a callee communication method 1200 applicable to a callee phone in accordance with an embodiment of the present application.

Please refer to FIG. 12A, which depicts a flowchart diagram of a callee communication method 1200 applicable to a callee phone in accordance with an embodiment of the present application. The communication method may be implemented by a communication application installed in the callee phone 130E as shown in FIG. 1. Unless there is a causal relation between two steps, the present application does not limit the execution order of the two steps. The callee communication method 1200 may begin at step 1210.

Step 1210: registering a ticket of a callee account with a validation code and optional properties to a communication server.

Step 1220: receiving an inbound communication with a caller id number from a telecommunication network. The inbound communication may be a call or a message.

Step 1230: per the received inbound communication, requesting the communication server to determine whether the inbound communication is acceptable according to the registered ticket.

Step 1240: determining whether an answer from the communication server with regard to the received inbound communication is acceptable or not. If it is determined acceptable by the communication server, the flow proceeds to step 1250; otherwise, the flow proceeds to step 1255.

Step 1250: determining whether a type of the inbound communication is call or message. If the type is call, the flow proceeds to step 1270. If the type is message, the flow proceeds to step 1260.

Step 1255: determining whether a type of the inbound communication is call or message. If the type is call, the flow proceeds to step 1275. If the type is message, the flow proceeds to step 1265.

Step 1260: prompting the inbound message to the callee.

Step 1265: deleting or hiding the inbound message.

Step 1270: prompting the inbound call to the callee and waiting for the callee to pick up the inbound call.

Step 1275: rejecting the call to the attached telecommunication network.

Step 1280: determining whether the callee answers the inbound call. If the callee answers the call, the flow proceeds to step 1290. If the callee does not answer the call, the flow proceeds to step 1295.

Step 1290: setting up the call with the attached telecommunication network.

Step 1295: failing to answer the call.

Figure 12B:
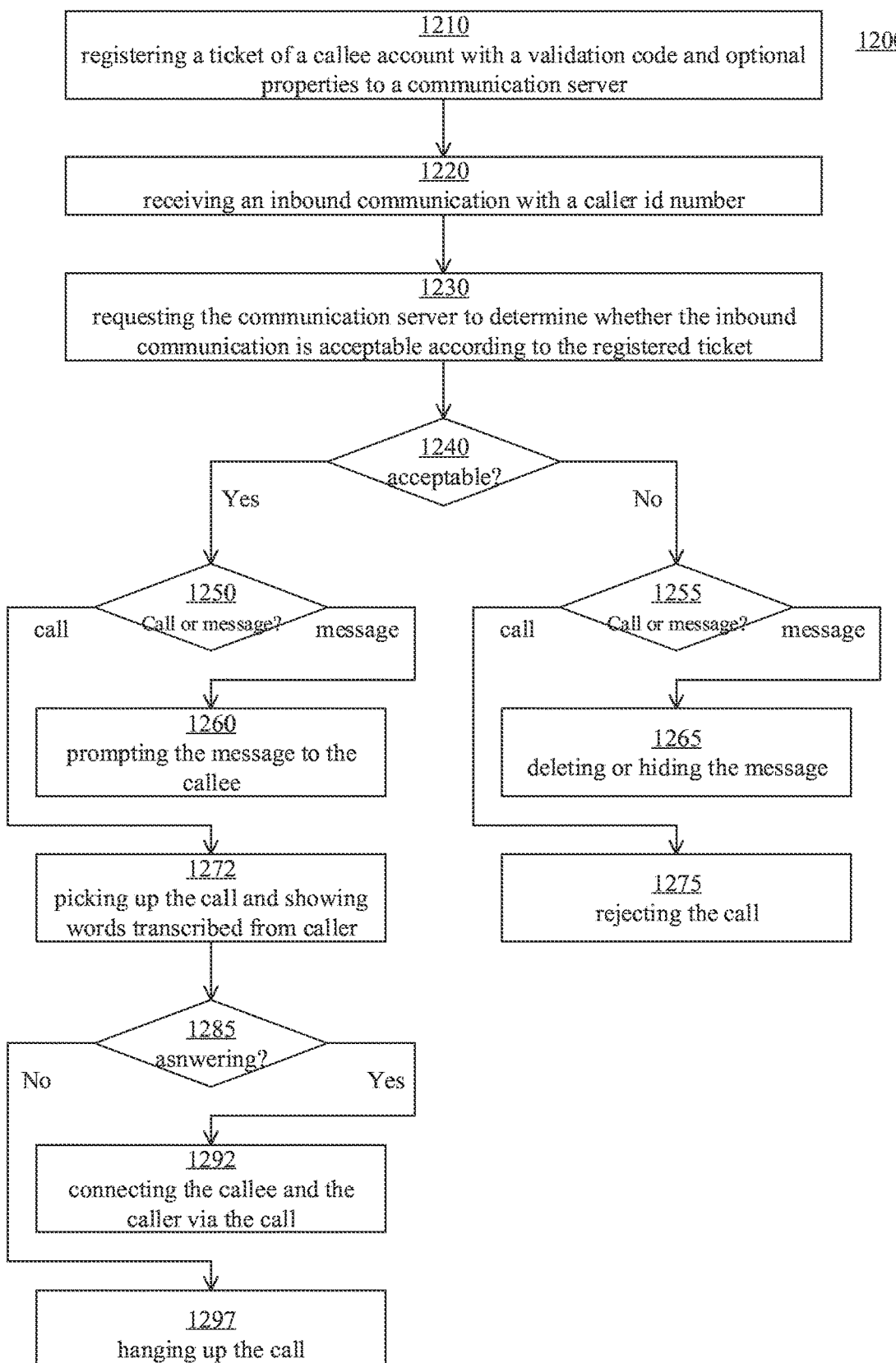
FIG. 12B depicts another flowchart diagram of a callee communication method 1200 applicable to a callee phone in accordance with an embodiment of the present application.

Please refer to FIG. 12B, which depicts another flowchart diagram of a callee communication method 1200 applicable to a callee phone in accordance with an embodiment of the present application. The communication method may be implemented by a communication application installed in the callee phone 130E as shown in FIG. 1. Unless there is a causal relation between two steps, the present application does not limit the execution order of the two steps. The callee communication method 1200 may begin at step 1210.

The differences between the embodiments as shown in FIGS. 12A and 12B includes the determination made at step 1250. When it is determined that the inbound communication is a call at step 1250, the flow proceeds to step 1272 rather than step 1270.

Step 1272: the communication application of the callee phone 130E may pick up the call. After that, the caller's speech is transcribed into text messages and shown on the callee phone 130E. Alternatively, the caller's speech or video may be played by the callee phone 130E. Person having ordinary skill in the art can understand that speech recognition function is a common input method implemented by the present smartphones. The communication application installed in the callee phone 130 can transcribe the caller's speech into text messages by utilizing the speech recognition function. The flow may proceed to step 1285.

Step 1285: while displaying the transcribed speech text or playing the caller's speech, the communication application of the callee phone 130E may wait for input from the callee to answer the call. When the callee decides to answer the call after reading the transcribed speech text, listening the speech, or watching the caller's video, the flow may proceed to step 1292. Otherwise, when the callee decides to reject the call after reading the transcribed speech text, listening the speech, or watching the caller's video, the flow may proceed to step 1297.

Step 1292: the communication application of the callee phone 130E may connect the callee and the caller via the phone. The callee and the caller may communicate with the call.

Step 1297: hanging up the call.

Figure 12C:
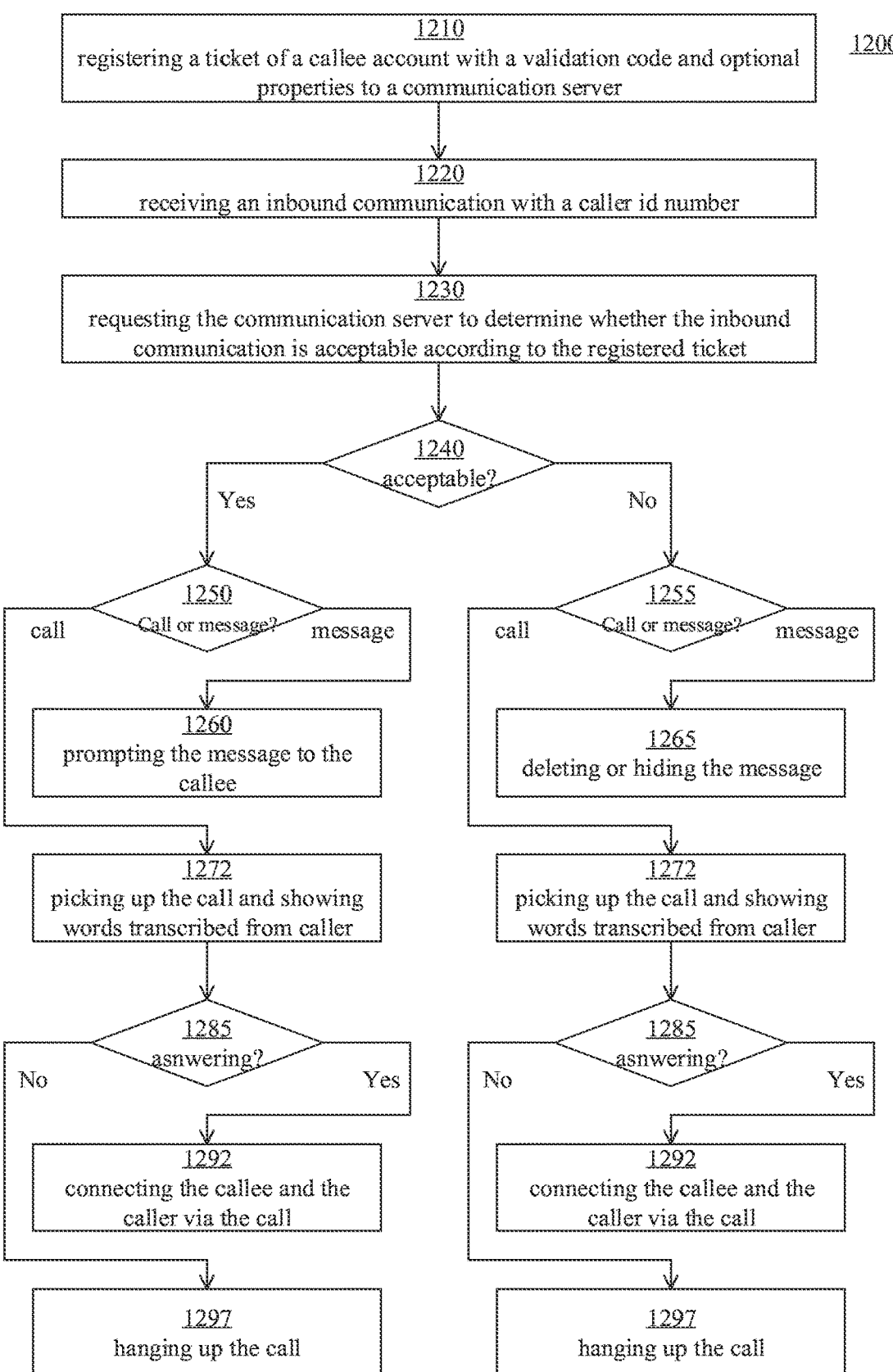
FIG. 12C depicts an alternative flowchart diagram of a callee communication method 1200 applicable to a callee phone in accordance with an embodiment of the present application.

Please refer to FIG. 12C, which depicts an alternative flowchart diagram of a callee communication method 1200 applicable to a callee phone in accordance with an embodiment of the present application. The communication method may be implemented by a communication application installed in the callee phone 130E as shown in FIG. 1. Unless there is a causal relation between two steps, the present application does not limit the execution order of the two steps. The callee communication method 1200 may begin at step 1210.

The differences between the embodiments as shown in FIGS. 12C and 12B includes the determination made at step 1255. When it is determined that the inbound communication is a call at step 1255, the flow proceeds to step 1272 rather than step 1275. In this embodiment, the communication application installed in the callee phone 130E may be configured by the callee to pick up the unacceptable inbound call to read, listen, or watch the caller's speech or video. The callee reserves a chance to answer this unacceptable inbound.

Figure 2:
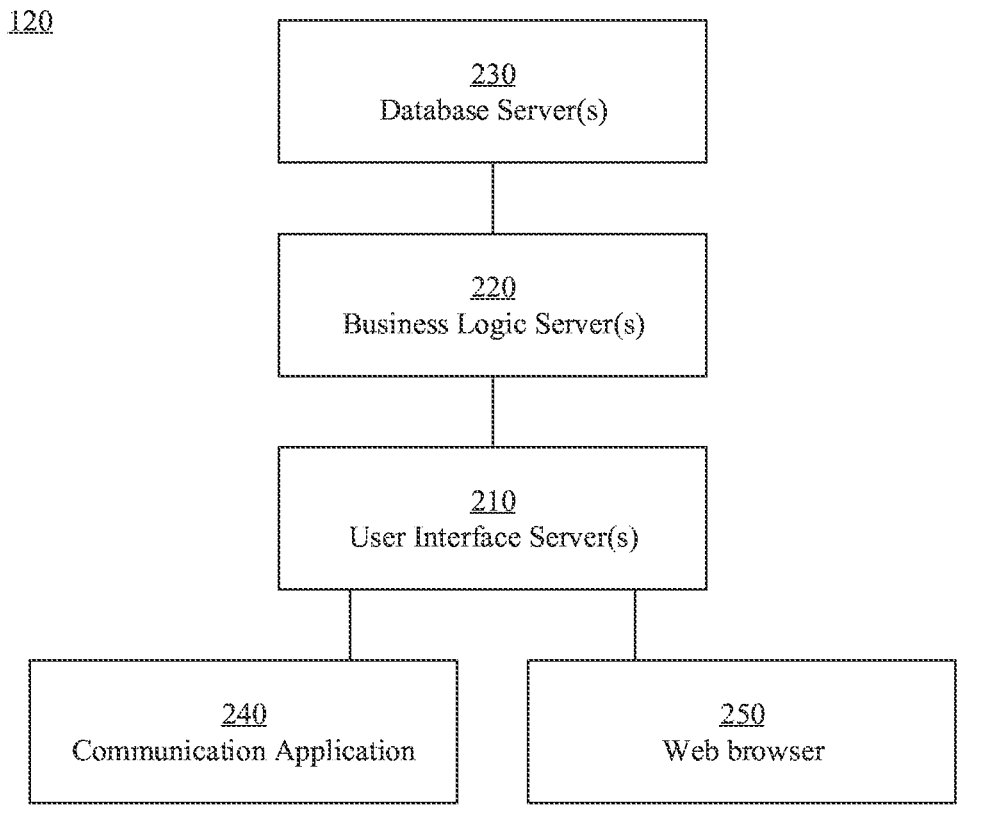
FIG. 2 shows a block diagram of the communication server 120 in accordance with an embodiment of the present invention.
Figure 13A:
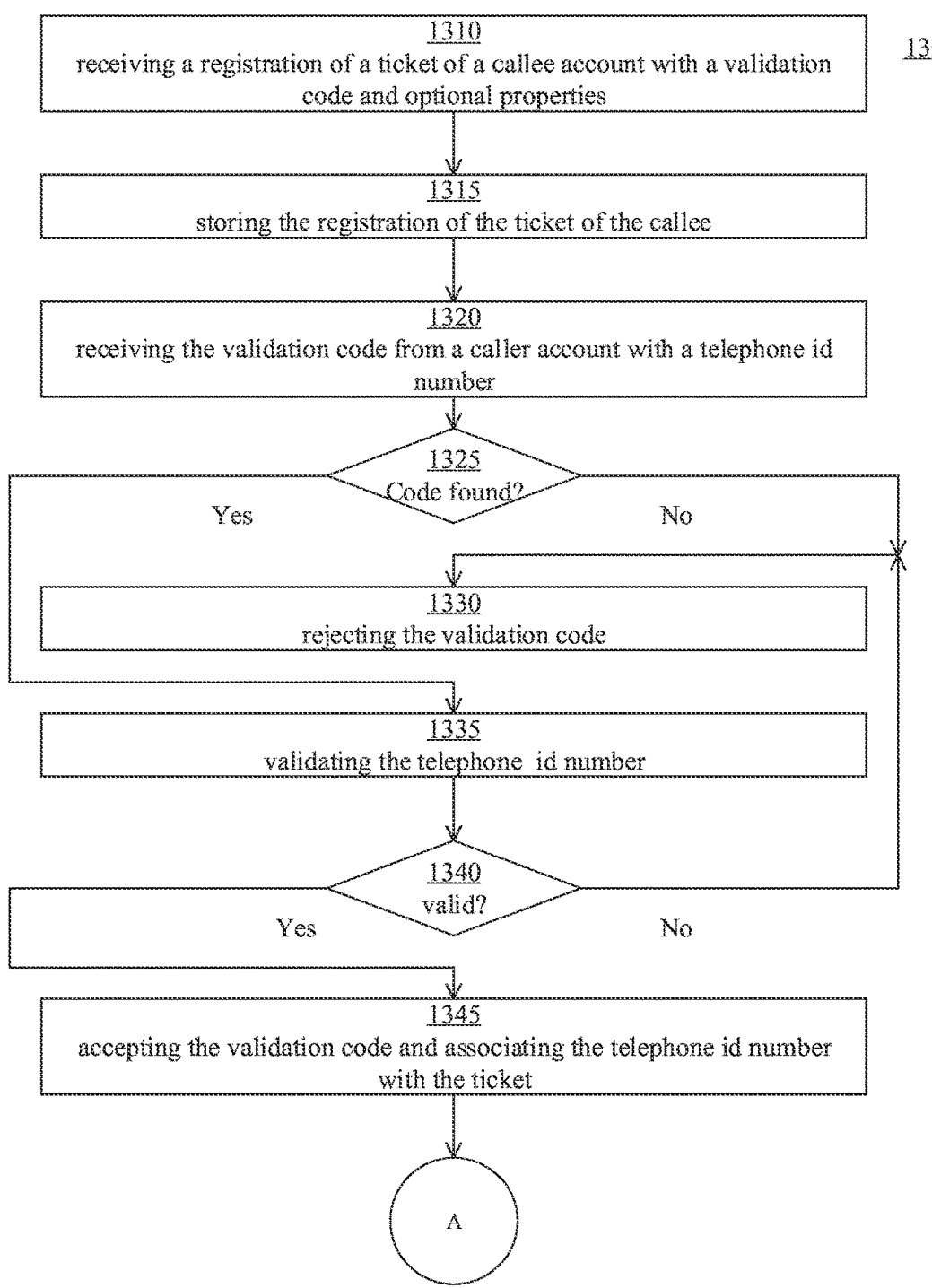
FIGS. 13A and 13B depicts a flowchart diagram of a communication servicing method 1300 applicable to a communication server in accordance with an embodiment of the present application.
Figure 13B:
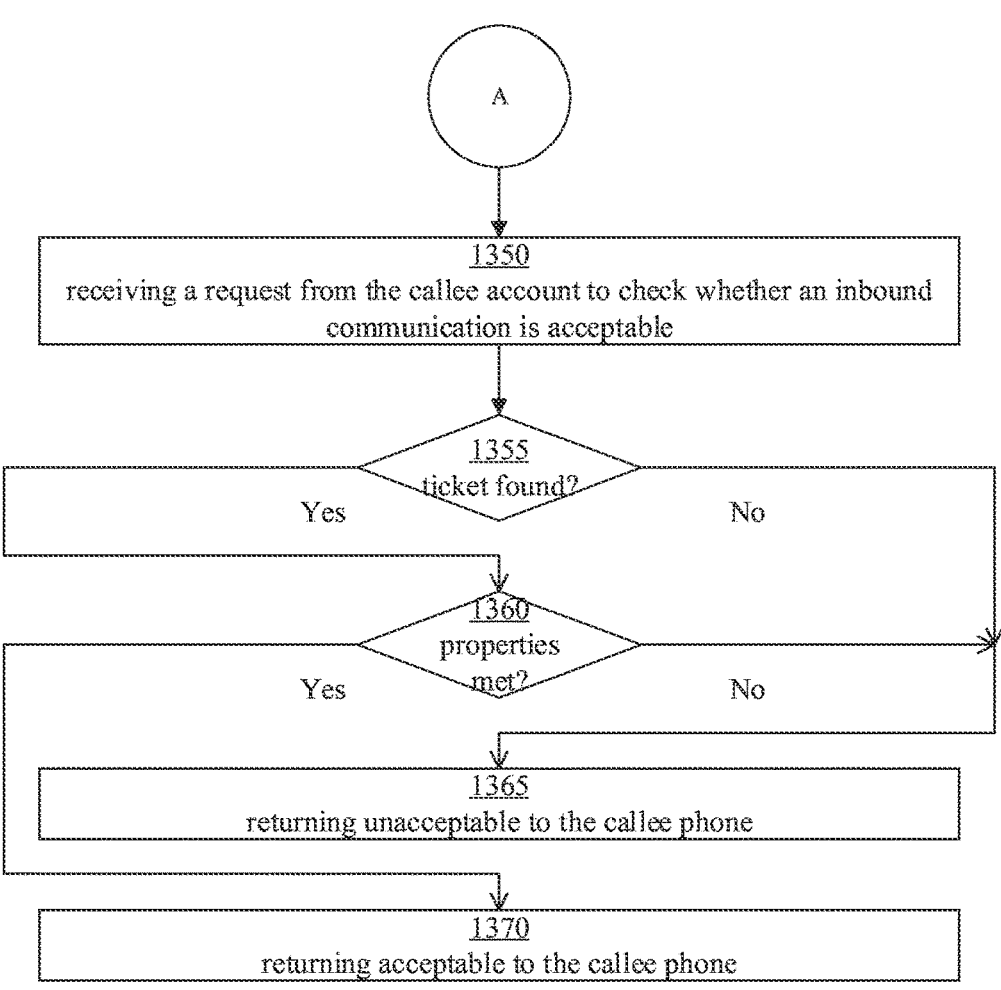

Please refer to FIGS. 13A and 13B, which depicts a flowchart diagram of a communication servicing method 1300 applicable to a communication server in accordance with an embodiment of the present application. The communication servicing method may be implemented by the communication server 120 as shown in FIGS. 1 and 2. Unless there is a causal relation between two steps, the present application does not limit the execution order of the two steps. The communication servicing method 1300 may begin at step 1310.

Step 1310: receiving a registration of a ticket of a callee account with a validation code and optional properties of the ticket.

Step 1315: storing the registration of the ticket of the callee account.

Step 1320: receiving the validation code from a caller account with a telephone id number. Optionally, the callee id number associated with the validation code may be also received. If the communication server 120 receives the validation code from a communication application installed in the caller phone 130R, the communication application would send the telephone id number of the caller phone 130R in default, i.e., the telephone id number is the caller id number. Alternatively, the caller may input another telephone id number other than the one of the caller phone 130R with the validation code. The situation is already discussed in the embodiment of the call sequence 700 as shown in FIG. 7.

Step 1325: determining whether the received validation code can be found in any tickets, especially the tickets associated with the callee id number. When the validation code as well as its ticket is found, the flow may proceed to optional step 1335 or step 1345. In one embodiment, when the telephone id number belongs to the caller phone 130R, i.e., the telephone id number is the caller id number, the flow may go to step 1345. Otherwise, when the telephone id number does not belong to the caller phone 130R, the flow may go to step 1335. In case that the received validation code cannot be found in any tickets, the flow proceeds to step 1330.

Step 1330: rejecting the validation code. The communication server may notify that the validation code cannot be associated with any ticket.

Step 1335: validating the telephone id number. The validating step is discussed at steps 622 and 624.

Step 1340: determining whether the telephone id number is valid. When it is valid, the flow proceeds to step 1345. When it is not valid, the flow goes to step 1335.

Step 1345: accepting the validation code and associating the telephone id number with the ticket.

Step 1350: receiving a request from the callee account to check whether an inbound communication is acceptable. This step 1350 is a counterpart of step 1230 as shown in FIGS. 12A and 12B. The request may include the callee user account, type of communication (i.e., call or message), the caller id number and/or local time associated with the inbound communication.

Step 1355: determining whether the inbound communication in the request can be associated with a ticket. For example, the telephone id number of the inbound communication may be searched according to the tickets of the callee user account. If a ticket of the callee user account is found being associated with the telephone id number, the flow may proceed to optional step 1360 in case the found ticket has one or more properties. If no ticket of the callee user account is found being associated with the telephone id number, the flow may proceed to step 1365.

Optional step 1360: determining whether the inbound communication in the request meets properties of the found ticket. If it meets, the flow proceeds to step 1370. If not, the flow proceeds to step 1365.

Step 1365: returning that the inbound communication is unacceptable to the callee phone.

Step 1370: returning that the inbound communication is acceptable to the callee phone.

Please refer to FIG. 14, which depicts a flowchart diagram of a caller communication method 1400 applicable to a caller in accordance with an embodiment of the present application. The communication servicing method may be implemented by the communication application installed in the caller phone 130R as shown in FIG. 1. Unless there is a causal relation between two steps, the present application does not limit the execution order of the two steps. The caller communication method 1400 may begin at step 1410.

Step 1410: sending a validation code of a callee and a telephone id number to a communication server for validation. Optionally, the callee id number may be also sent. This step 1410 is a counterpart of step 1320 as shown in FIG. 13A. If the telephone id number is not corresponding to the caller phone 130R, the flow may proceed to optional step 1420 for validation. Otherwise, the flow may proceed to step 1430.

Step 1420: processing a validation procedure by the telephone corresponding to the telephone id number from the communication server for validation. The situation is already discussed in the embodiment of the call sequence 700 as shown in FIG. 7.

Step 1430: when the validation code is accepted by the communication server, initiating an outbound communication to the callee with optional validation code via the telephone corresponding to the telephone id number.

According to an embodiment of the present application, a callee communication method is provided. The callee communication method comprising: registering a ticket of a callee account with a validation code to a communication server; receiving an inbound communication corresponding to a caller id number from a telecommunication network; requesting the communication server to determine whether the inbound communication is acceptable according to the registered ticket; and when the communication server returns that the inbound communication is acceptable, prompting a callee to answer a call when a type of the inbound communication is call.

Preferably, in order to respond to the inbound communication, the callee communication further comprises one or any combination of following steps: when the communication server returns that the inbound communication is acceptable, prompting the callee a message when the type of the inbound communication is message; when the communication server returns that the inbound communication is unacceptable, rejecting the call when the type of the inbound communication is call; and when the communication server returns that the inbound communication is unacceptable, deleting the message when the type of the inbound communication is message.

Preferably, in order to provide more conditions for receiving the inbound communication, wherein the ticket further includes one or any combination of following properties: expiry time; available time windows; acceptable type of communication; and times of communication.

Preferably, in order to let the communication server determines whether the inbound communication is acceptable or not according to additional condition, wherein the requesting step further comprises sending one or any combination of following parameters to the communication server: the callee account; a type of the inbound communication; the caller id number; and local time when the requesting step is being performing.

Preferably, in order to let the callee have more information about the caller's intention, the callee communication method further comprises picking up the call when the type of the inbound communication is call; and one or any combination of following steps: transcribing a caller's speech into text and showing the transcribed text; playing the caller's speech; and playing the caller's video.

According to an embodiment of the present application, a caller communication method is provided. The caller communication method comprising: sending a validation code of a callee and a telephone id number to a communication server for validation; and when the validation code is accepted by the communication server, initiating an outbound communication to the callee via a telephone corresponding to the telephone id number and a telecommunication network which the telephone attaches to.

Preferably, in order to make sure that the telephone id number inputted by the caller is valid, the caller communication method further comprises after sending the validation code, processing a validation procedure by the telephone corresponding to the telephone id number from the communication server via the telecommunication network for validation.

Preferably, in order to let the telephone id number associating with correct ticket, the sending step further comprises sending a callee id number of the callee to the communication server.

Preferably, in order to let a normal telephone can initiate a call, wherein the sending step is not performed by the telephone corresponding to the telephone id number.

Preferably, in order to access the callee by call or message, wherein a type of the outbound communication is one of following: call and message.

According to an embodiment of the present application, a communication servicing method comprising: receiving a request from a callee account to check whether an inbound communication received by a callee phone via a telecommunication network is acceptable; determining whether a caller id number of the inbound communication is associated with a ticket registered by the callee account; and returning that the inbound communication is acceptable to the callee phone when the caller id number of the inbound communication is associated with the ticket registered by the callee account.

Preferably, in order to associate the ticket with inputted telephone number, before the receiving the request, the communication servicing method further comprises: receiving a registration of the ticket of the callee account with a first validation code; storing the registration of the ticket of the callee account; receiving a second validation code from a caller account corresponding to the caller id number; and associating the caller id number with the ticket when the first validation code is identical to the second validation code.

Preferably, in order to make sure that the telephone id number inputted by the caller is valid, the communication servicing method further comprises: validating a telephone corresponding to the caller id number via a telecommunication network; and determining whether the caller id number is valid or not according to the validating step, wherein the associating the caller id number with the ticket is performed when the caller id number is valid.

Preferably, in order to let the telephone id number associating with correct ticket, wherein the receiving the second validation code further comprises receiving a callee id number from the caller account, wherein the ticket is associated with the callee id number.

Preferably, in order to in order to let the communication server determines whether the inbound communication is acceptable or not according to additional condition, wherein the requesting further comprises receiving one or any combination of following parameters: the callee account; a type of the inbound communication; the caller id number; and local time of the callee phone.

Preferably, in order to provide more conditions for receiving the inbound communication, wherein the ticket further includes one or any combination of following properties: expiry time; available time windows; acceptable type of communication; and times of communication.

Preferably, in order to in order to let the communication server determines whether the inbound communication is acceptable or not according to additional condition, wherein the ticket further comprises at least one property, wherein the communication servicing method further comprises: returning that the inbound communication is acceptable when one or more parameters of the inbound communication meets the at least one property of the ticket registered by the callee account.

Preferably, in order to provide more conditions for receiving the inbound communication, wherein the ticket further includes one or any combination of following properties: expiry time; available time windows; acceptable type of communication; and times of communication.

Preferably, in order to associate non-expired ticket with the telephone id number, the communication servicing method further comprises associating the caller id number with the ticket when the first validation code is identical to the second validation code and when the ticket is not expired.

Preferably, in order to let public sectors can initiate communication to the callee, the communication servicing method further comprises: receiving and storing telephone id numbers of public sectors; and returning that the inbound communication is acceptable to the callee phone when the caller id number of the inbound communication is one of the stored telephone id numbers of public sectors.

In summarized, the present application provides a client-server mechanism for managing inbound communication to a callee. The callee may use registered tickets for conditioning inbound communications to a server and distribute validation codes of the registered tickets to potential callers who may have needs to communicate with the callee. The caller who indeed has needs must input a validation code before initiate a communication to the callee. The step can help to filter a large portion of unwanted or unnecessary inbound communications for the callee. Moreover, thanks to automatically rejecting calls or deleting messages provided by the present application, the callee can be free of harassment because the registered tickets may be expired.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A callee communication method, comprising:

registering a communication ticket in a communication server, the communication ticket associated with a callee account and including a validation code and an authorized communication type associated with the validation code, wherein a callee device supplies information associated with the communication ticket to the communication server and the communication server confirms registering of the communication ticket to the callee device;

receiving an inbound communication from a caller device corresponding to a caller id number at the communication server, the inbound communication including a caller-proposed validation code and a communication type;

requesting the communication server to determine whether the inbound communication is acceptable or unacceptable according to whether the caller-proposed validation code and the communication type of the inbound communication matches the validation code and authorized communication type of the communication ticket, and when acceptable, validating the inbound communication by associating the caller id number with the communication ticket and reporting validation of the inbound communication to both the caller device and the callee device; and after the communication server reporting validation of the inbound communication is acceptable to the callee, and the caller device initiating a communication to the callee device via a telecommunication network, prompting a callee to answer a call when the communication type of the inbound communication is call.

2. The callee communication method of claim 1, further comprising one or any combination of the following steps:

after the communication server reporting validation of the inbound communication is acceptable to the callee, prompting the callee with a message when the communication type of the inbound communication is message;

after the communication server reporting validation of the inbound communication is unacceptable, rejecting the communication to the callee device via the telecommunication network when the communication type of the inbound communication is call; and after the communication server reporting validation of the inbound communication is unacceptable, deleting the message when the communication type of the inbound communication is message.

3. The callee communication method of claim 1, wherein the communication ticket further includes one or any combination of the following properties:

an expiry time for the communication ticket;

available time windows for the communication ticket;

a list of acceptable communication types that includes the communication type; and times of communication for the communication ticket.

4. The callee communication method of claim 1, wherein the requesting step further comprises sending and using one or any combination of the following parameters to the communication server to determine whether the inbound communication is acceptable or unacceptable:

the callee account;

a communication type of the inbound communication;

the caller id number; and a local time of the callee device when the requesting step is being performing.

5. The callee communication method of claim 1, further comprising the callee device answering the call after prompting the callee to answer the call when the communication type of the inbound communication is call; and one or any combination of following steps:

transcribing speech received from the caller device into text and displaying the transcribed text on the callee device;

playing the speech received from the caller device on the callee device; and playing video received from the caller device on the callee device.

\* \* \* \* \*